(12) United States Patent
Teraoka et al.

(10) Patent No.: US 10,377,219 B2
(45) Date of Patent: Aug. 13, 2019

(54) TRACTOR

(71) Applicant: Kubota Corporation, Osaka-shi (JP)

(72) Inventors: Tasuku Teraoka, Sakai (JP); Takeshi Komorida, Sakai (JP); Takashi Kumashiro, Sakai (JP); Shoichiro Nagaishi, Sakai (JP); Tomohisa Yamamoto, Sakai (JP); Akihito Mihara, Sakai (JP); Ryo Matsumoto, Sakai (JP); Hiroki Nagai, Sakai (JP); Yuto Akai, Sakai (JP); Yoshihisa Tonoya, Sakai (JP); Masaki Takaoka, Sakai (JP); Tatsuki Kago, Sakai (JP); Nobuyuki Yamashita, Sakai (JP); Junichi Yamanaka, Sakai (JP); Masahiro Izumi, Sakai (JP); Azusa Furihata, Sakai (JP); Koichiro Matsumoto, Sakai (JP); Takashi Shibata, Sakai (JP)

(73) Assignee: Kubota Corporation, Osaka (JP)

( * ) Notice: Subject to any disclaimer, the term of this patent is extended or adjusted under 35 U.S.C. 154(b) by 0 days.

(21) Appl. No.: 15/606,003

(22) Filed: May 26, 2017

(65) Prior Publication Data

US 2018/0056772 A1     Mar. 1, 2018

(30) Foreign Application Priority Data

Aug. 31, 2016  (JP) ................................ 2016-170018
Aug. 31, 2016  (JP) ................................ 2016-170019
Aug. 31, 2016  (JP) ................................ 2016-170020

(51) Int. Cl.
*B60K 5/12*       (2006.01)
*B62D 25/08*    (2006.01)
(Continued)

(52) U.S. Cl.
CPC .......... *B60K 5/1208* (2013.01); *B60K 5/1216* (2013.01); *B62D 25/082* (2013.01);
(Continued)

(58) Field of Classification Search
CPC .. B60K 5/1208; B60K 5/1216; B60K 5/1291; B62D 25/082; B62D 25/085; B62D 25/12
(Continued)

(56) References Cited

U.S. PATENT DOCUMENTS 1,648,875 A  *  11/1927  Griese ...................... B60K 5/10
                                                                                 105/133
1,699,332 A  *   1/1929  Link ......................... F16F 7/00
                                                                                 180/300
(Continued)

FOREIGN PATENT DOCUMENTS

JP          200460813 A       2/2004
JP        2006264536 A      10/2006
JP          20071421 A        1/2007

*Primary Examiner* — Frank B Vanaman
(74) *Attorney, Agent, or Firm* — The Webb Law Firm

(57) ABSTRACT

A tractor includes an engine that is mounted on a vehicle body frame, a hood that houses the engine and is configured to pivot about a front pivot in a top-bottom direction between a closed position at which the hood covers the engine, and an open position at which the hood exposes the engine, a mounting rubber that is provided between the engine and the vehicle body frame to support the engine in an anti-vibration manner, and a hood stay that supports the hood such that the hood is pivotable up/down about the front pivot. The hood stay includes an abutting-target portion against which the engine can abut from a rear side, to prevent the engine from swinging forward in a front-rear direction of the vehicle body.

4 Claims, 26 Drawing Sheets

(51) Int. Cl.
*B62D 25/10* (2006.01)
*B62D 49/06* (2006.01)
*B60K 5/02* (2006.01)

(52) U.S. Cl.
CPC ............... *B62D 25/10* (2013.01); *B60K 5/02* (2013.01); *B60Y 2200/221* (2013.01); *B60Y 2200/223* (2013.01); *B62D 49/06* (2013.01)

(58) Field of Classification Search
USPC ...................................... 180/299, 300, 69.21
See application file for complete search history.

(56) References Cited

U.S. PATENT DOCUMENTS

| | | | | |
|---|---|---|---|---|
| 3,841,426 | A * | 10/1974 | Nemschoff | B60K 5/1216 180/291 |
| 3,951,223 | A * | 4/1976 | Kamlukin | B60K 5/10 180/11 |
| 5,645,133 | A * | 7/1997 | Thompson | E05D 7/105 16/254 |
| 5,730,239 | A * | 3/1998 | Holter | B62D 25/12 180/69.21 |
| 5,782,312 | A * | 7/1998 | Murakawa | B60K 11/08 180/68.1 |
| 6,003,204 | A * | 12/1999 | Roach | E05D 7/1072 16/266 |
| 8,225,894 | B2 * | 7/2012 | Mizuta | B62D 25/12 180/69.21 |
| 2004/0020702 | A1 | 2/2004 | Oshima et al. | |
| 2017/0129544 | A1 * | 5/2017 | Komorida | B62D 25/12 |

* cited by examiner

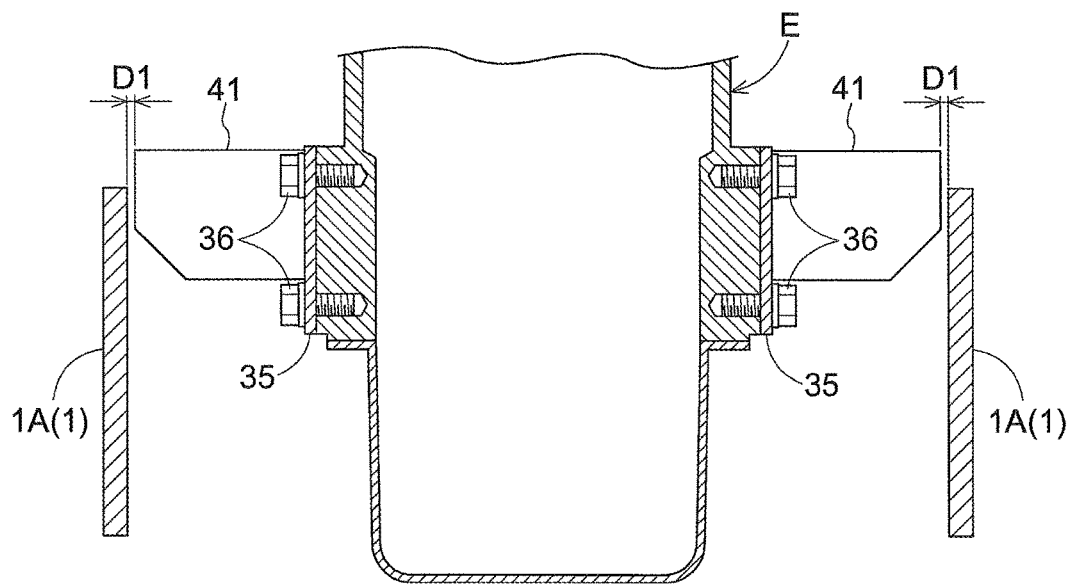
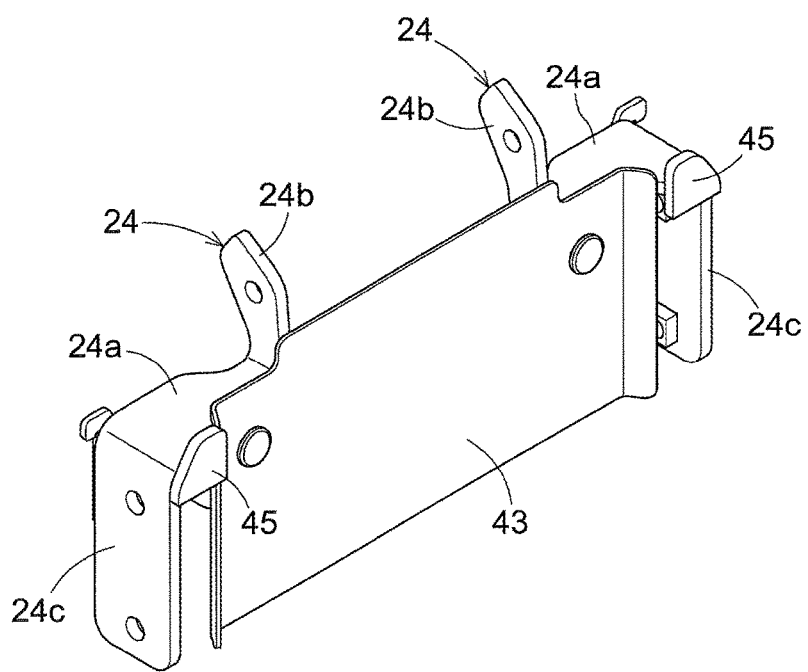

TRACTOR

CROSS-REFERENCE TO RELATED APPLICATIONS

This application claims priority to Japanese Patent Applications Nos. 2016-170018, 2016-170019, and 2016-170020, each filed Aug. 31, 2016, the disclosures of which are hereby incorporated in their entirety by reference.

BACKGROUND OF THE INVENTION

1. Field of the Invention

The present invention relates to a tractor. More specifically, the present invention relates, but not exclusively, to a tractor that includes: a vehicle body frame; an engine; a hood that houses the engine; and an anti-vibration member that supports the engine in an anti-vibration manner.

2. Description of the Related Art

One of such a tractor is disclosed in JP 2004-060813 A or US 2004/0020702 A1 corresponding thereto. This tractor includes: an engine that is mounted on a vehicle body frame ("a vehicle body" in US 2004/0020702 A1); a hood that houses the engine; and an anti-vibration member ("rubber cushions" in US 2004/0020702 A1) that is provided between the engine and the vehicle body frame, and supports the engine for an anti-vibration purpose.

This conventional tractor realizes a comfortable ride by reducing the vibration of the engine using the anti-vibration member. However, there is room for improvement to prevent a front portion (e.g. a flywheel) of the engine from coming into contact with the hood when the engine swings forward via the anti-vibration member. In other words, there is a need for a tractor in which the front portion of the engine can be reliably prevented from coming into contact with the hood even when the engine swings forward via the anti-vibration member.

SUMMARY OF THE INVENTION

In view thereof, a following tractor is proposed, comprising:

a vehicle body frame;

an engine that is mounted on a front portion of the vehicle body frame;

a hood that houses the engine, the hood being configured to pivot up/down about a front pivot that is located on a front end of the vehicle body frame, between a closed position at which the hood covers the engine and an open position at which the hood exposes the engine;

an anti-vibration member that is provided between the engine and the vehicle body frame and supports the engine in an anti-vibration manner; and a hood stay that supports the hood such that the hood is pivotable up/down about the front pivot, the hood stay including an abutting-target portion against which the engine can abut from a rear side, to prevent the engine from swinging forward in a front-rear direction of the vehicle body.

With this configuration, when the engine swings forward via the anti-vibration member, the engine abuts against an abutting-target portion from the rear side, and thus the engine is prevented from swinging forward. Thus, the front portion of the engine can be prevented from coming into contact with the hood.

In one preferred embodiment, the abutting-target portion has a width thereof in a right-left direction of the vehicle body, greater than a width thereof in the front-rear direction of the vehicle body.

With this configuration, the abutting-target portion is wider in the right-left direction of the vehicle body, and therefore the engine can reliably abut against the abutting-target portion from the rear side even if the engine swings forward and to the right or forward and to the right via the anti-vibration member.

In one preferred embodiment, the anti-vibration member includes: a first anti-vibration member that is attached by a first attaching member to a position that is forward and to the right of the engine; and a second anti-vibration member that is attached by a second attaching member to a position that is forward and to the left of the engine, the abutting-target portion includes: a first abutting-target portion that is located forward and to the right of the engine; and a second abutting-target portion that is located forward and to the left of the engine, and the first attaching member is configured to abut against the first abutting-target portion from the rear side, and the second attaching member is configured to abut against the second abutting-target portion from the rear side.

With this configuration, portions of the engine on the right and left sides, to which the anti-vibration members are attached, i.e. portions from which the engine starts pivoting, abut against the abutting-target portions. Thus, it is possible to reliably prevent the engine from swinging.

In one preferred embodiment, a first front-rear gap is formed between the first attaching member and the first abutting-target portion in the front-rear direction of the vehicle body, and a second front-rear gap is formed between the second attaching member and the second abutting-target portion in the front-rear direction of the vehicle body.

In one preferred embodiment, the vehicle body frame includes: a first main frame that is located on a right side of the engine and extends in the front-rear direction of the vehicle body; and a second main frame that is located on a left side of the engine and extends in the front-rear direction of the vehicle body, the hood stay includes: a first hood stay that is provided on a surface of the first main frame inside the vehicle body; and a second hood stay that is provided on a surface of the second main frame inside the vehicle body, and the abutting-target portion includes: a first abutting-target portion that is located on a rear end of the first hood stay; and a second abutting-target portion that is located on a rear end of the second hood stay.

In one preferred embodiment, a first engine supporting frame that supports a right portion of the engine extends in the front-rear direction of the vehicle body inside the first main frame relative to the vehicle body, and a second engine supporting frame that supports a left portion of the engine extends in the front-rear direction of the vehicle body inside the second main frame relative to the vehicle body, the anti-vibration member includes: a first anti-vibration member that is attached to a position between a front end of the first engine supporting frame and the first main frame by a first attaching member; and a second anti-vibration member that is attached to a position between a front end of the second engine supporting frame and the second main frame by a second attaching member, and the first attaching member is configured to abut against the first abutting-target portion from the rear side, and the second attaching member is configured to abut against the second abutting-target portion from the rear side.

In one preferred embodiment, the vehicle body frame includes: a first main frame that is located on a right side of the engine and extends in the front-rear direction of the vehicle body; and a second main frame that is located on a left side of the engine and extends in the front-rear direction of the vehicle body, a first engine supporting frame that supports a right portion of the engine extends in the front-rear direction of the vehicle body inside the first main frame relative to the vehicle body, and a second engine supporting frame that supports a left portion of the engine extends in the front-rear direction of the vehicle body inside the second main frame relative to the vehicle body, a first lateral-swing stopper member for the engine is provided on and protrudes from a surface of the first engine supporting frame on the first main frame side, with a first lateral gap between the first lateral-swing stopper member and the first main frame, and a second lateral-swing stopper member for the engine is provided on and protrudes from a surface of the second engine supporting frame on the second main frame side, with a second lateral gap between the second lateral-swing stopper member and the second main frame.

In one preferred embodiment, the tractor further comprises a flywheel that is attached to a front end of the engine, wherein the hood stay includes: a first hood stay that is located forward and to the right of the engine; and a second hood stay that is located forward and to the left of the engine, and a cover that covers the flywheel from a front side extends between the first hood stay and the second hood stay.

Other features and advantageous effects achieved thereby will become apparent after reading the following description with reference to the accompanying drawings.

BRIEF DESCRIPTION OF THE DRAWINGS

FIG. 9 is a rear cross-sectional view showing a situation where the left engine supporting frame and the right engine supporting frame are fixed to the engine;

FIG. 10 is a perspective view showing a pair of right and left hood stays;

DETAILED DESCRIPTION OF PREFERRED EMBODIMENTS

First Embodiment

The following describes a first embodiment with reference to FIGS. 1 to 15.

Figure 1:
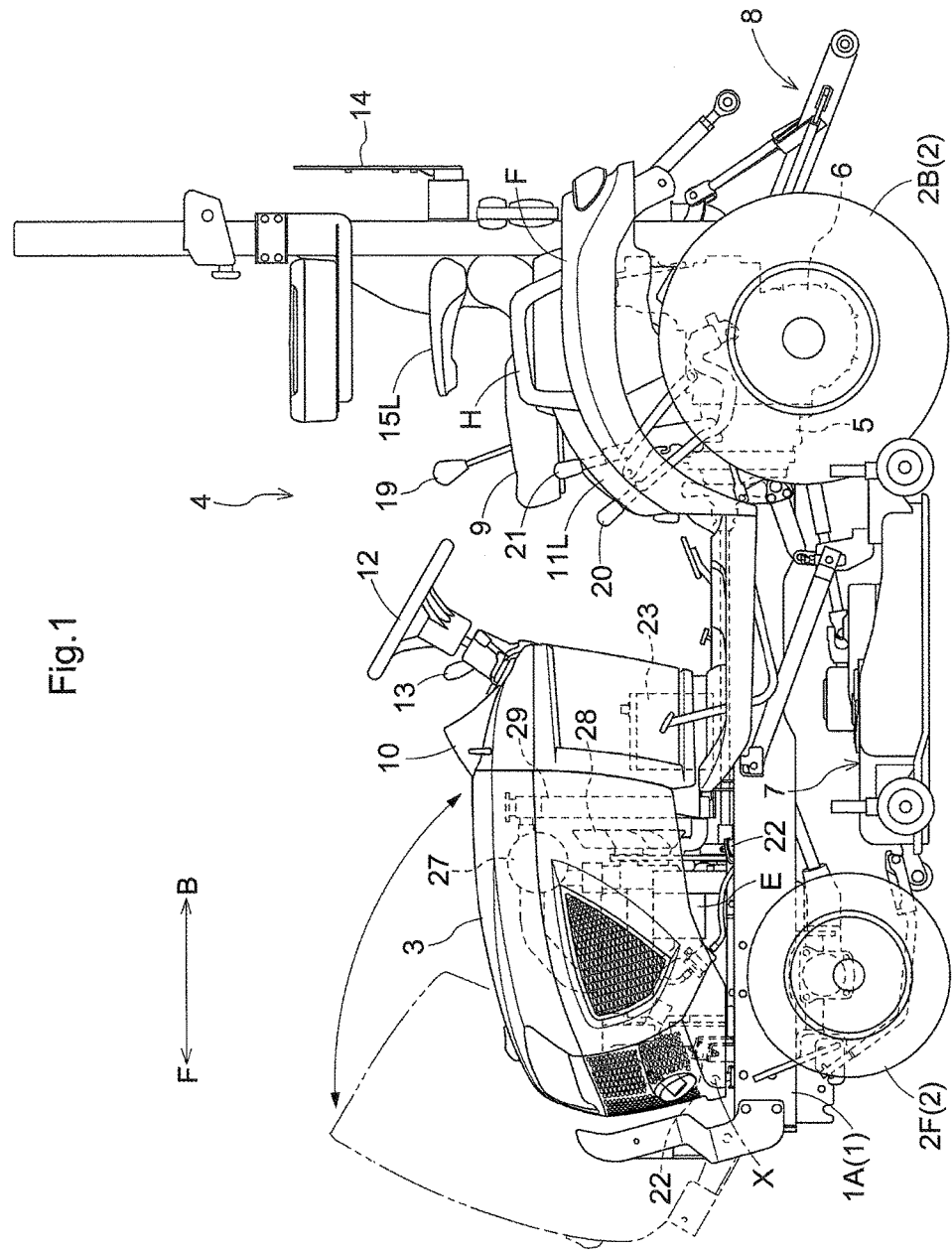
FIG. 1 shows a first embodiment (the same applies to the following drawings up to FIG. 15), in particular a left side view showing a tractor.
Figure 2:
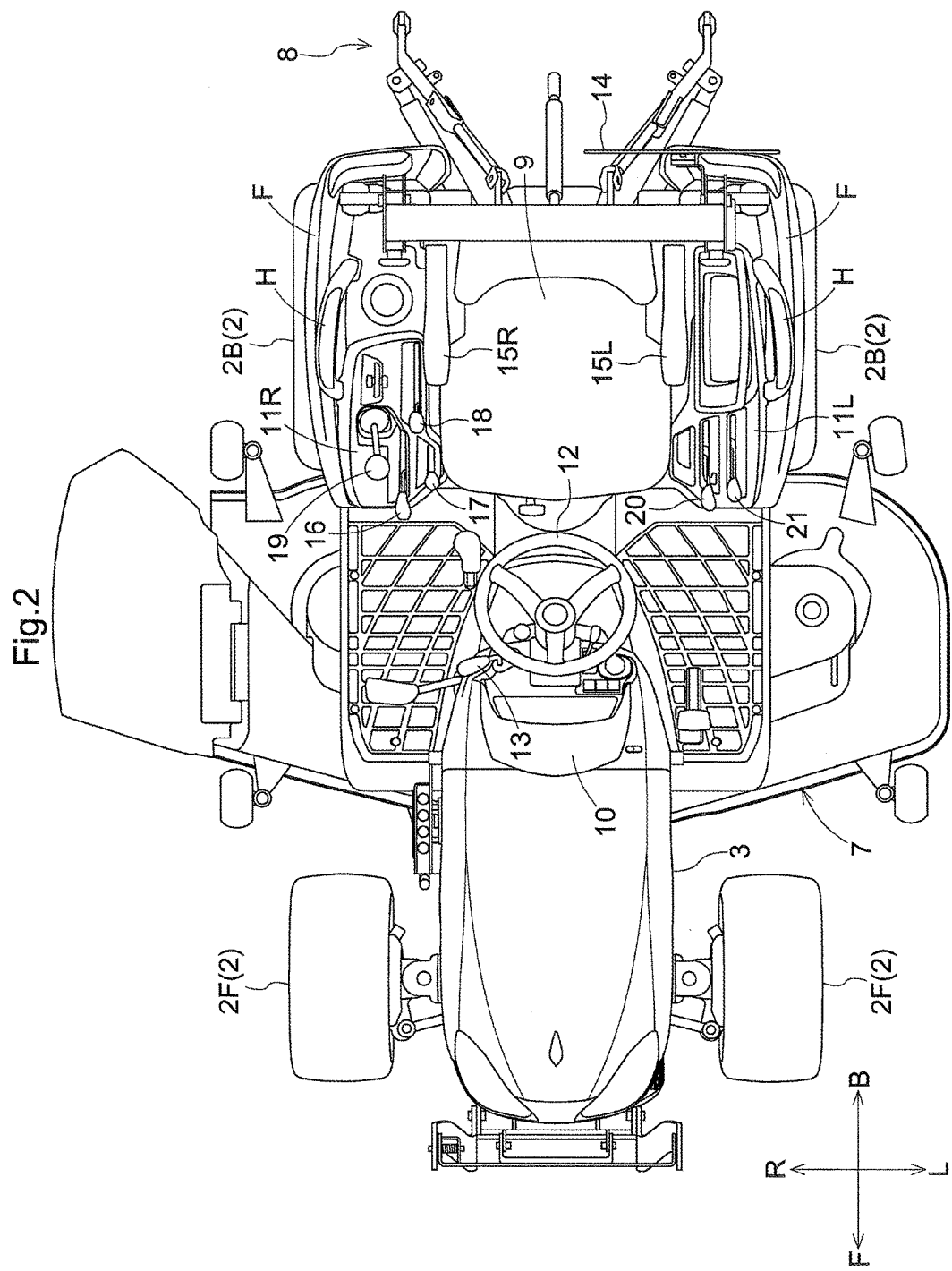
FIG. 2 is a plan view showing the tractor.

Unless explicated otherwise, the direction indicated by an arrow F in FIGS. 1 and 2 is regarded as "forward of the vehicle body", the direction indicated by an arrow B in FIGS. 1 and 2 is regarded as "rearward of the vehicle body", the direction indicated by an arrow L in FIG. 2 is regarded as "leftward of the vehicle body", and the direction indicated by an arrow R in FIG. 2 is regarded as "rightward of the vehicle body" (the same applies to second and third embodiments that will be described later).

Overall Configuration of Tractor

FIGS. 1 and 2 show a tractor. The tractor includes: a vehicle body frame 1; and a wheel type travelling apparatus 2 that supports the vehicle body frame 1. The vehicle body frame 1 includes a pair of right and left main frames 1A that extend in the front-rear direction of the vehicle body. The travelling apparatus 2 includes: a pair of right and left front wheels 2F that are steerable and drivable; and a pair of right and left rear wheels 2B that are drivable. A pair of right and left fenders F that cover the rear wheels 2B are provided. The fenders F are provided with handrails H that serve as handles when the driver gets on and off the tractor, for example.

A hood 3 is provided at front half portion of the vehicle body frame 1. An engine E is housed in the hood 3. The engine E is supported by mounting rubbers (corresponding to "anti-vibration member") 22 in an anti-vibration manner, and is mounted on the vehicle body frame 1, with the mounting rubbers 22 being interposed therebetween. The hood 3 is pivotable in a top-bottom direction about a front pivot X, between a closed position at which the hood 3 covers the engine E and an open position at which the hood 3 exposes the engine E.

A driving section 4 is provided at a rear half portion of the vehicle body frame 1. The driving section 4 includes: a hydrostatic continuously variable transmission apparatus 5 that serves as a main transmission apparatus; and a transmission case 6. The transmission case 6 houses, for example, a gear type transmission apparatus (not shown) that serves as an auxiliary transmission apparatus.

A front loader (not shown) can be attached to the tractor. A mower 7 is provided between the front wheels 2F and the rear wheels 2B below the vehicle body frame 1 such that the mower 7 can be raised and lowered. A rear end of the vehicle body frame 1 includes a linkage mechanism 8 to which a work implement (not shown) such as a rotary plowing apparatus can be attached.

In order to drive the mower 7, the driving force of the engine E can be taken from a power takeoff (hereinafter abbreviated as "PTO") shaft, which is a mid PTO shaft (not shown) in this embodiment. In order to drive the work implement, the driving force of the engine E can be taken from a rear PTO shaft (not shown). A PTO clutch (not shown) is provided to be switched to a transmission state and a blocking state is provided. In the transmission state, the PTO clutch transmits the driving force of the engine E to the rear and mid PTO shafts, and in the blocking state, the PTO clutch blocks the driving force of the engine E from being transmitted to the rear and mid PTO shafts.

Driving Section

As shown in FIGS. 1 and 2, the driving section 4 includes: a driver's seat 9 on which the driver can sit; a front panel 10; a right lever guide 11R; and a left lever guide 11L. The front panel 10 includes: a steering wheel 12 to steer the vehicle body; and an accelerator lever 13 to change the number of revolutions of the engine E. A battery 23 is provided inside the front panel 10. A warning reflector 14 is provided rearward and to the left of the driver's seat 9 for providing a warning rearward of the vehicle.

The driver's seat 9 includes a left armrest 15L and a right armrest 15R. The driver seated on the driver's seat 9 can put his/her left arm on the left armrest 15L and his/her right arm on the right armrest 15R. The left armrest 15L and the right armrest 15R are pivotable in a top-bottom direction about a rear pivot, between their respective operative positions and retracted positions. At operative positions thereof, the left armrest 15L and the right armrest 15R extend in the front-rear direction of the vehicle body, and at the retracted positions, the left armrest 15L and the right armrest 15R extend in a top-bottom direction.

The left lever guide 11L is provided on the upper surface of the left fender F. The left lever guide 11L includes: a PTO clutch lever 20 to switch the PTO clutch; and a PTO selection lever 21 to select a PTO shaft to be driven.

The right lever guide 11R is provided on the upper surface of the right fender F. The right lever guide 11R includes: an auxiliary transmission lever 16 to shift the auxiliary transmission apparatus; a switching lever 17 switch the travelling apparatus 2 to a four wheel drive state and a two wheel drive state; an up/down lever 18 to raise and lower the work implement; and an operation lever 19 to operate the front loader.

Hood

Figure 3:
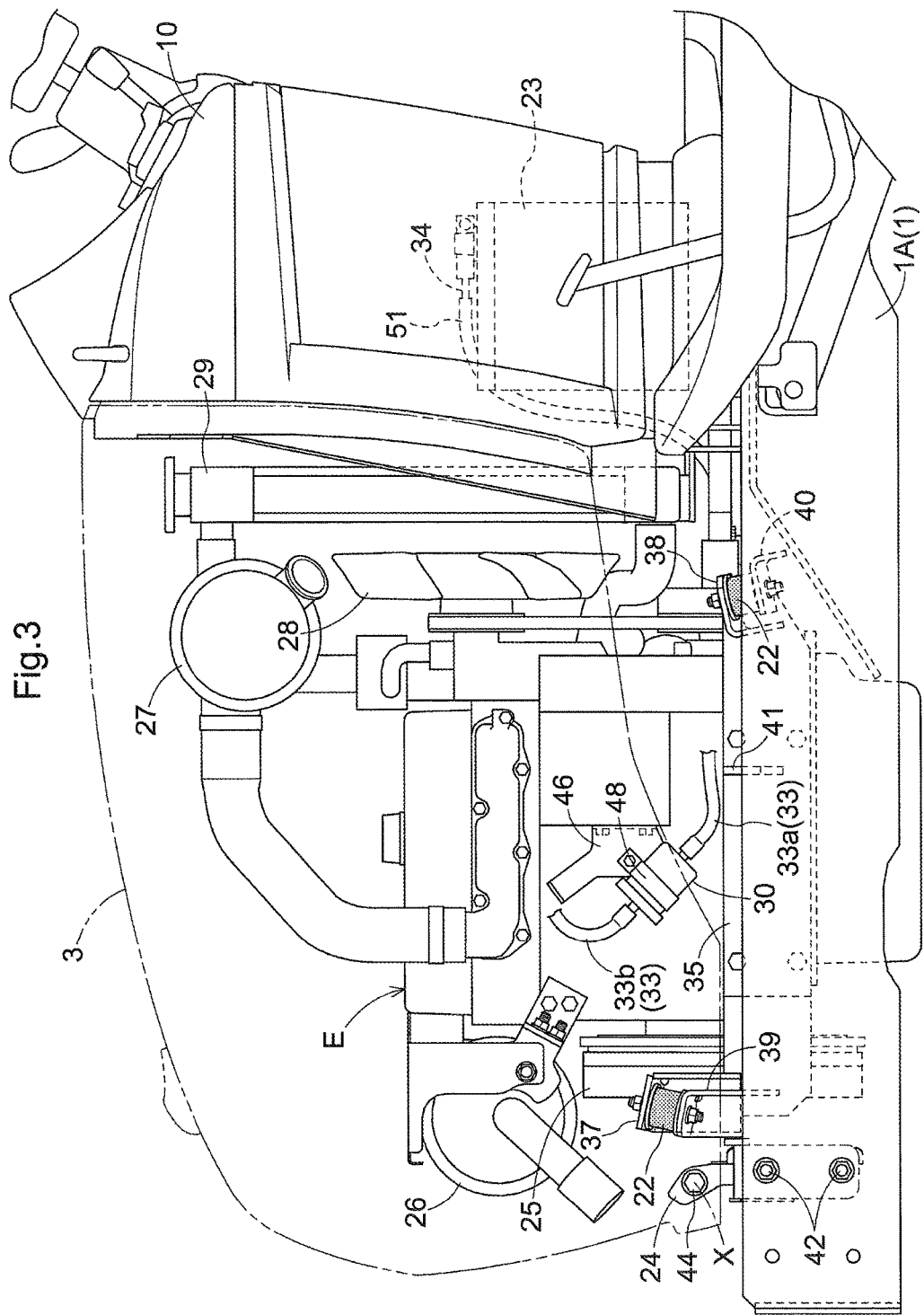
FIG. 3 is a left side view showing an internal structure of a hood.
Figure 4:
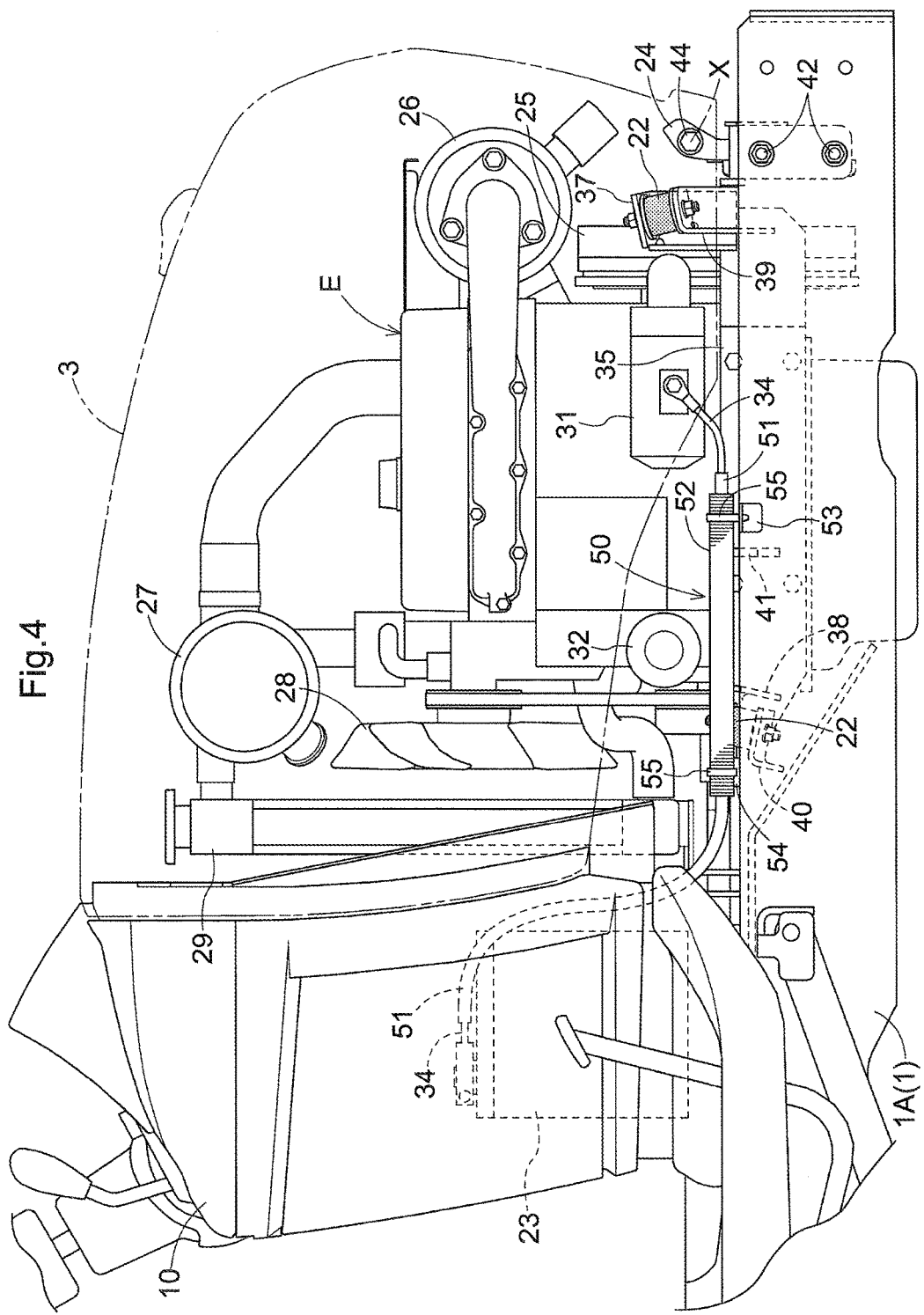
FIG. 4 is a right side view showing an internal structure of the hood.
Figure 5:
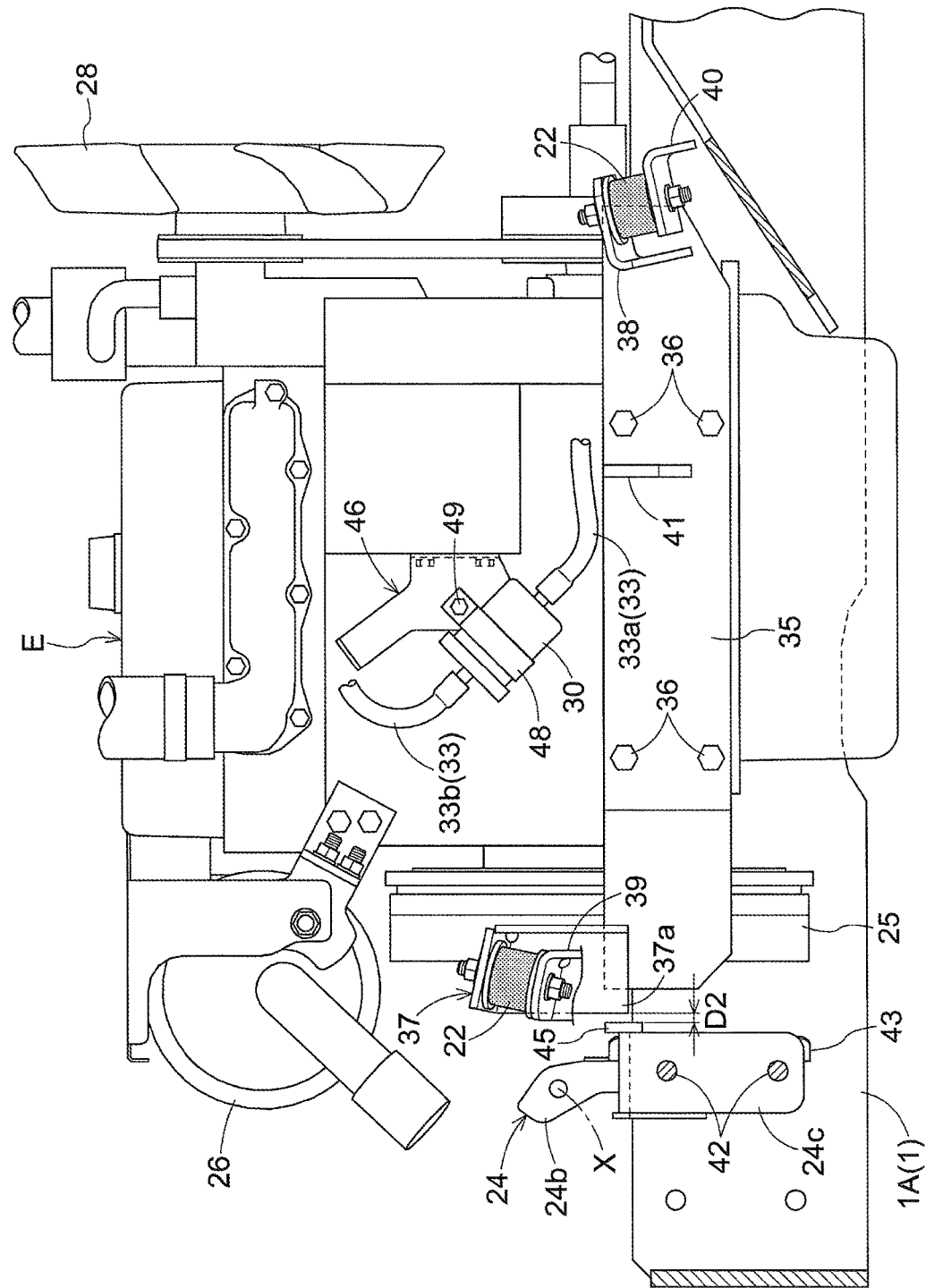
FIG. 5 is a left side view showing a situation where an engine is mounted on a vehicle body frame.
Figure 6:
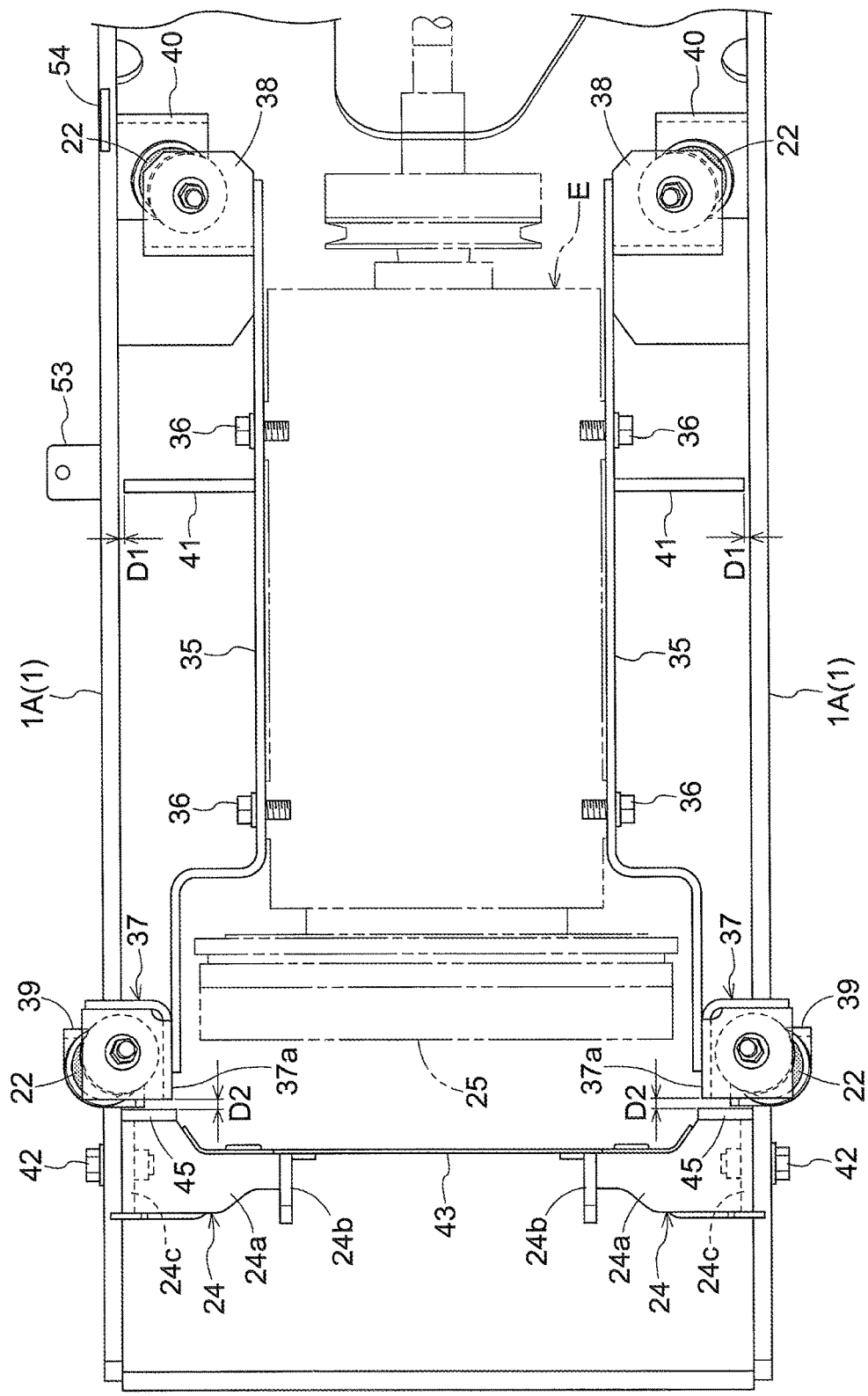
FIG. 6 is a plan view showing a situation where the engine is mounted on the vehicle body frame.
Figure 7:
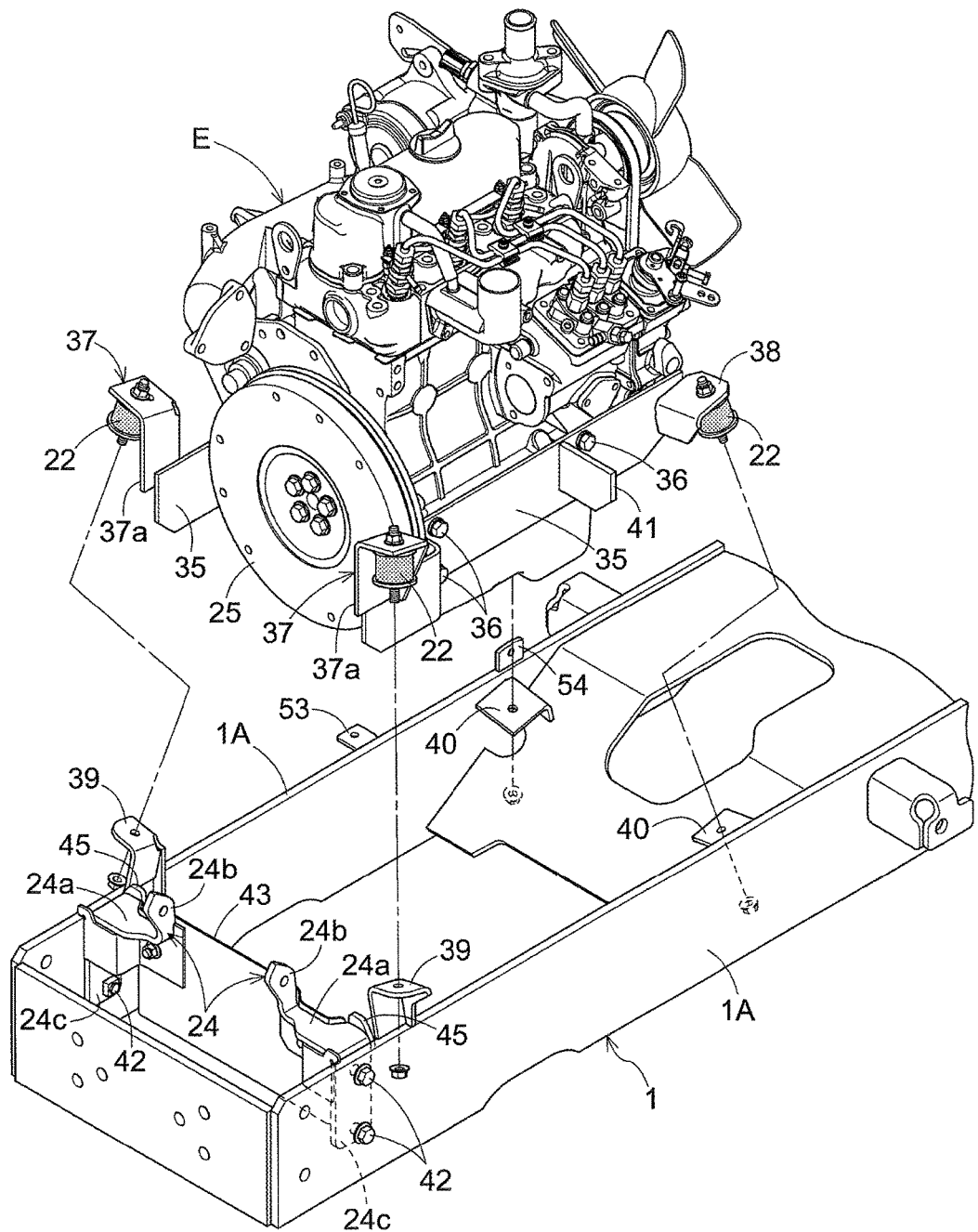
FIG. 7 is an exploded perspective view showing a structure for mounting the engine onto the vehicle body frame.
Figure 8:
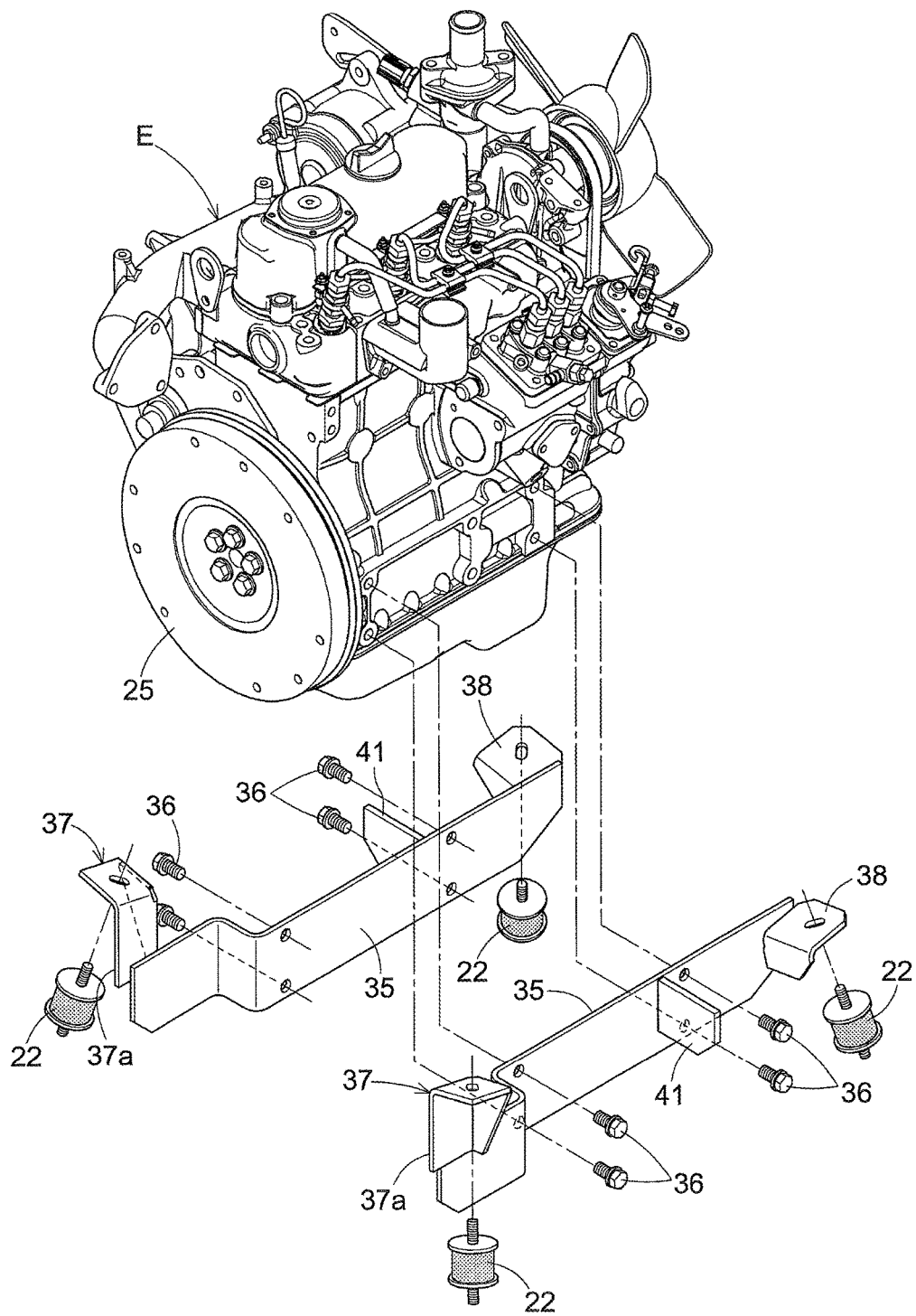
FIG. 8 is an exploded perspective view showing a structure for fixing a left engine supporting frame and a right engine supporting frame to the engine.

As shown in FIGS. 3 and 4, the hood 3 is supported by a pair of right and left hood stays 24 to be pivotable in the top-bottom direction about the front pivot X. A damper (not shown) is provided biasing the hood 3 such that hood 3 pivots upward toward the open position about the front pivot X.

In addition to the engine E, a flywheel 25, a muffler 26, an air cleaner 27, a cooling fan 28, a radiator 29, a fuel filter 30, a starter 31, an oil filter 32, and so on are provided inside the hood 3. The flywheel 25 and the muffler 26 are provided on a front portion of the engine E. The air cleaner 27 and the cooling fan 28 are provided on a rear portion of the engine E. The radiator 29 is provided rearward of the engine E. The fuel filter 30 is provided on a left portion of the engine E. The starter 31 and the oil filter 32 are provided on a right portion of the engine E.

Fuel in a fuel tank (not shown) is supplied to the engine E via a fuel hose 33. A hose 33a of the fuel hose 33, which is on the fuel tank side, and a hose 33b of the fuel hose 33, which is on the engine E side, are connected to the fuel filter 30. The battery 23 and the starter 31 are electrically connected to each other via a battery cord 34.

As shown in FIGS. 5 to 8, the engine E is located between a pair of right and left main frames 1A. Engine supporting frames 35 are respectively fixed to the left portion and the right portion of the engine E using bolts 36.

The engine supporting frames 35 are respectively provided with pairs of front and rear attachment stays 37 and 38 to which the mounting rubbers 22 are attached. The front attachment stays 37 are provided on front ends of the engine supporting frames 35. The rear attachment stays 38 are provided on rear ends of the engine supporting frames 35. The main frames 1A are respectively provided with pairs of front and rear mounting brackets 39 and 40 on which the mounting rubbers 22 are mounted and fixed.

As shown in FIG. 9, the left engine supporting frame 35 and the right engine supporting frame 35 are respectively provided with lateral-pivot stopper plates 41 for stopping the engine E from swinging in the right-left direction of the vehicle body.

The left lateral-pivot stopper plate 41 is fixed (e.g. fixed by welding) to the left surface of the left engine supporting frame 35 so as to protrude leftward. A small gap D1 is provided between the left end surface of the left lateral-pivot stopper plate 41 and the right surface of the left main frame 1A (the surface inside the vehicle body).

The right lateral-pivot stopper plate 41 is fixed (e.g. fixed by welding) to the right surface of the right engine supporting frame 35 so as to protrude rightward. A small gap D1 is provided between the right end surface of the right lateral-pivot stopper plate 41 and the left surface of the right main frame 1A (the surface inside the vehicle body).

With such a configuration, when the engine E swings in the right-left direction of the vehicle body via the mounting rubbers 22, the left lateral-pivot stopper plate 41 and the right lateral-pivot stopper plate 41 respectively abut against the left main frame 1A and the right main frame 1A, and thus the engine E is prevented from swinging in the right-left direction of the vehicle body.

Hood Stays

As shown in FIGS. 5 to 7 and 10, the left hood stay 24 is fixed to the left main frame 1A at two positions using bolts 42 so as to abut against the right surface of the left main frame 1A (the surface inside the vehicle body). The right hood stay 24 is fixed to the right main frame 1A at two positions using bolts 42 so as to abut against the left surface of the right main frame 1A (the surface inside the vehicle body). A cover 43 extends between the pair of right and left hood stays 24. The cover 43 covers a lower portion of the front surface of the flywheel 25 from the front side.

Each hood stay 24 is formed in a substantially crank-like shape when viewed in a front-rear direction. Each hood stay 24 includes: a lateral portion 24a that extends in the right-left direction of the vehicle body; an upper portion 24b that extends upward from an end of the lateral portion 24a inside the vehicle body; and a lower portion 24c that extends downward from an end of the lateral portion 24a outside the vehicle body. Lateral portions 24a are provided with recessed portions 24d into which the cover 43 is fitted. The hood 3 is fixed to the upper portions 24b using bolts 44 so as to be pivoted up/down about the front pivot X. In other words, the upper portions 24b support the hood 3 so as to be pivoted up/down about the front pivot X, with the bolts 44 being interposed therebetween. The lower portions 24c are fixed to the main frames 1A using bolts 42.

Abutting-target Portions

The hood stays 24 are provided with abutting-target portions 45 against which the engine E can abut from the rear side. In the present embodiment, the abutting-target portions 45 are members that are separate from the hood stays 24, and are fixed (e.g. fixed by welding) to the hood stays 24. Each abutting-target portion 45 is constituted by a plate-like member, and is wider in the right-left direction of the vehicle body. The abutting-target portions 45 are provided on rear end surfaces of the hood stays 24, specifically on ends of the lateral portions 24a on the side of the lower portions 24c (at corners formed by the lateral portions 24a and the lower portions 24c).

Lower ends of side plate portions 37a of the front attachment stays 37 are located within ranges in which the abutting-target portions 45 exist, in the top-bottom direction. The side plate portions 37a of the front attachment stays 37 are located within ranges in which the abutting-target portions 45 exist, in the right-left direction of the vehicle body. Small gaps D2 are provided between the rear surfaces of the abutting-target portions 45 and the front end surfaces of the side plate portions 37a of the front attachment stays 37.

Figure 11:
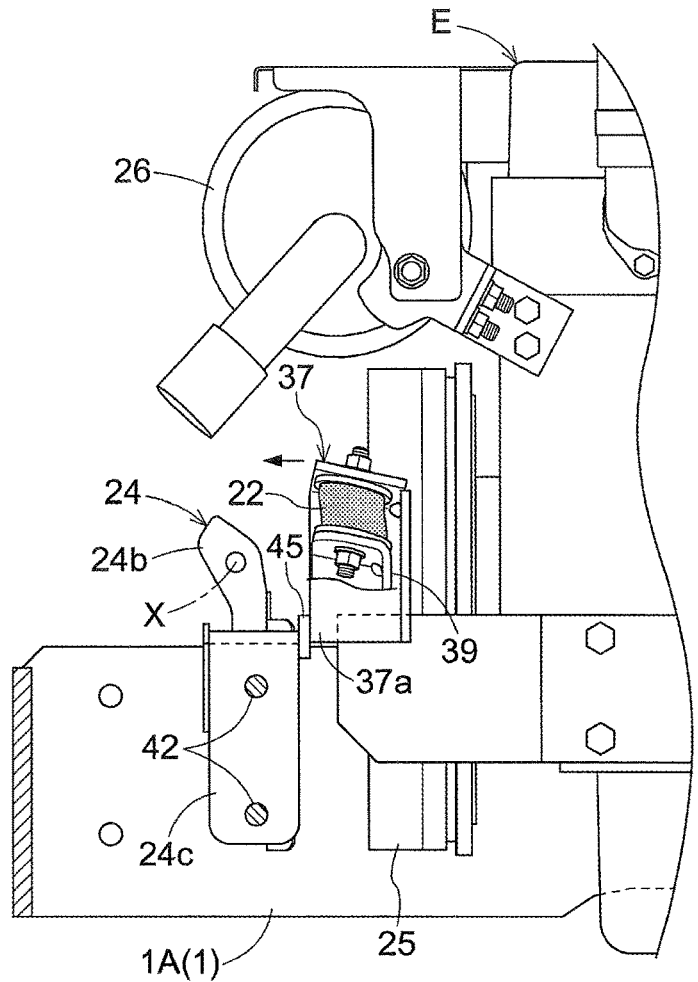
FIG. 11 is a left side view showing a front attachment stay abutting against an abutting-target portion from a rear side.

With such a configuration, when the engine E swings forward via the mounting rubbers 22, the side plate portions 37a of the front attachment stays 37 abut against the abutting-target portions 45 from the rear side (see FIG. 11). Thus, the engine E is prevented from swinging forward, and therefore the front portion (e.g. the flywheel 25) of the engine E can be prevented from coming into contact with the hood 3.

Structure for Attaching Fuel Filter

Figure 12:
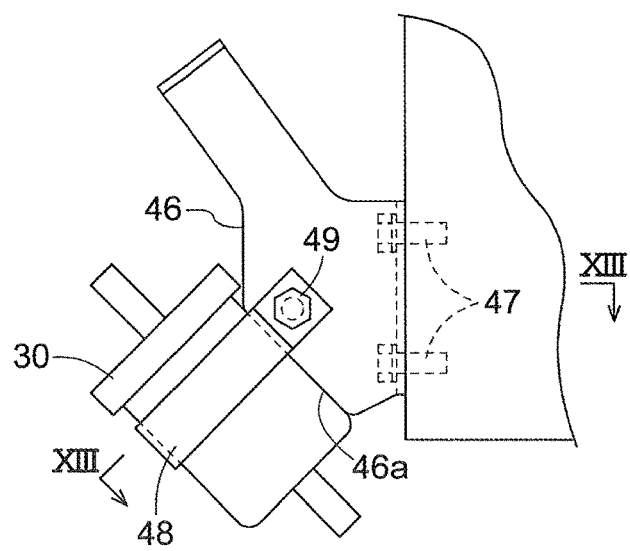
FIG. 12 is a left side view showing a structure for attaching a fuel filter.
Figure 13:
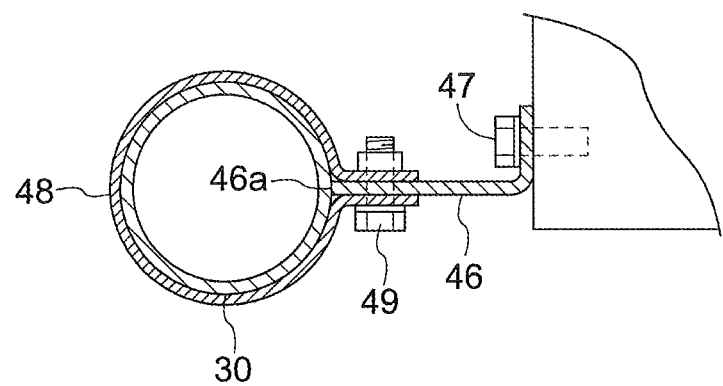
FIG. 13 is a cross-sectional view along XIII-XIII in FIG. 12.

As shown in FIGS. 12 and 13, the fuel filter 30 is supported on a left portion of the engine E, with a stay 46 being interposed therebetween. The stay 46 is fixed to the left portion of the engine E using bolts 47. However, the stay 46 may be fixed to the engine E by welding instead of using bolts.

The fuel filter 30 is attached to the stay 46 so as to be inclined upward in a forward direction. A band 48 is wound around an outer circumferential portion of the fuel filter 30. The two ends of the band 48 are fixed to the stay 46 using a bolt 49 so as to sandwich the stay 46.

The stay 46 includes an orientation determining portion 46a that determines the orientation of the fuel filter 30. The orientation determining portion 46a is a surface that is inclined upward in a forward direction. The fuel filter 30 is attached to the stay 46 so as to abut against the orientation determining portion 46a. With this configuration, when the fuel filter 30 is to be attached to the stay 46, it is possible to easily attach the fuel filter 30 to the stay 46 in a predetermined orientation by simply attaching the fuel filter 30 to the orientation determining portion 46a.

Structure for Fixing Battery Cord at a Position

Figure 14:
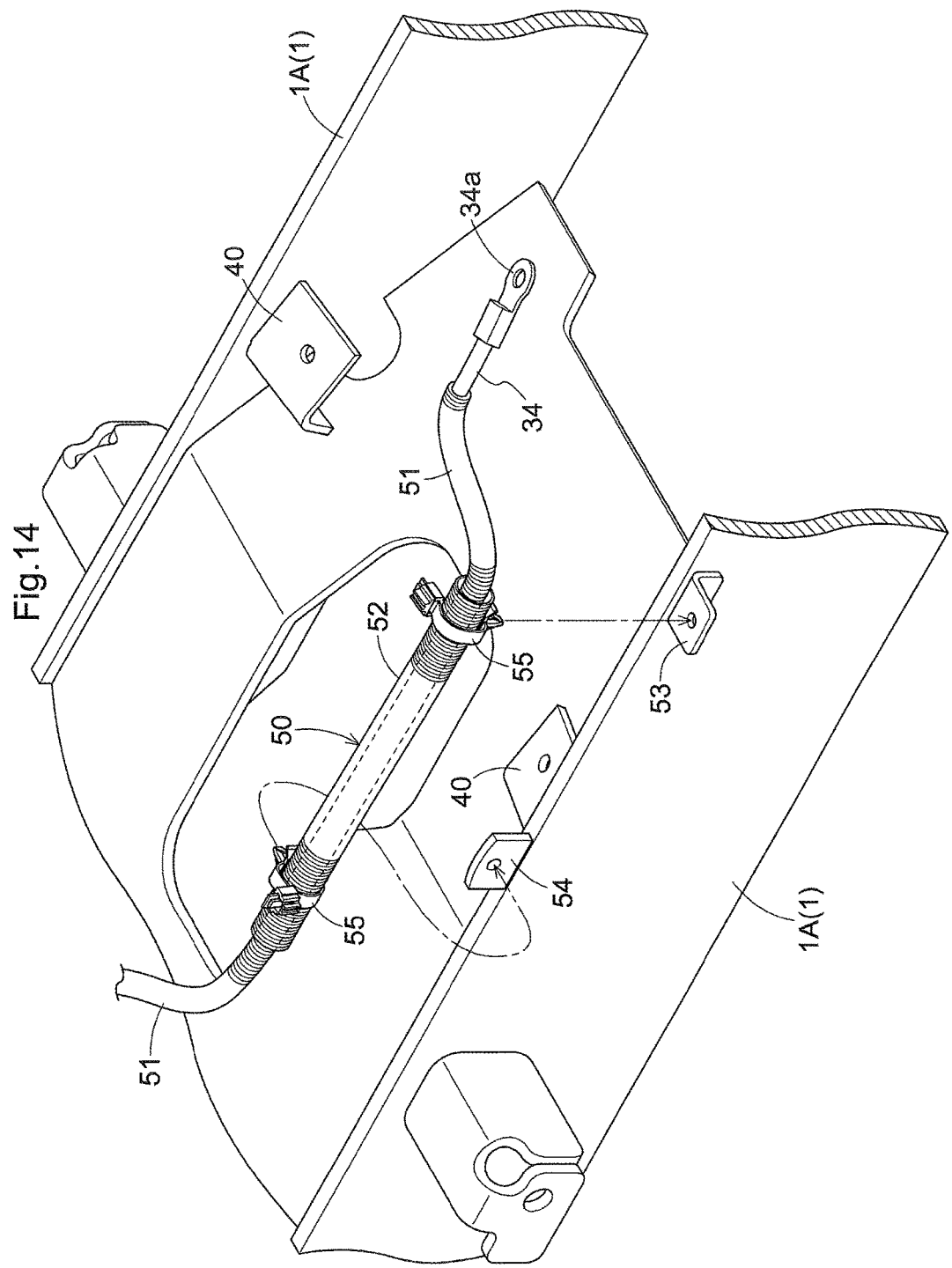
FIG. 14 is an exploded perspective view showing a structure for fixing a position of a battery cord.

As shown in FIGS. 4 and 14, the battery cord 34 is covered by a double corrugated tube 50. The double corrugated tube 50 includes: a small-diameter corrugated tube 51 that covers the battery cord 34; and a large-diameter corrugated tube 52 that covers the small-diameter corrugated tube 51.

The large-diameter corrugated tube 52 covers the small-diameter corrugated tube 51 so as to enclose a portion of the small-diameter corrugated tube 51 below the oil filter 32. The large-diameter corrugated tube 52 extends straight along the right main frame 1A in the front-rear direction of the vehicle body, and thus passes below the oil filter 32. The large-diameter corrugated tube 52 is fixed to brackets 53 and 54 (at two positions) using clips 55. The brackets 53 and 54 are fixed (e.g. fixed by welding) to the right main frame 1A.

The small-diameter corrugated tube 51 is fixed to the battery cord 34, whereas the large-diameter corrugated tube 52 is not fixed to the small-diameter corrugated tube 51. In other words, the small-diameter corrugated tube 51 cannot be moved relative to the battery cord 34, whereas the large-diameter corrugated tube 52 can be moved relative to the small-diameter corrugated tube 51.

With such a configuration, even if the position of the starter 31 varies depending on the size of the engine E, for example, it is possible to change the position of a terminal 34a of the battery cord 34 on the starter 31 side according to the position of the starter 31 by moving the battery cord 34 together with the small-diameter corrugated tube 51 in the extending direction relative to the large-diameter corrugated tube 52.

Other Embodiments Related to First Embodiment

The following describes other embodiments. Two or more of the other embodiments below may be combined and applied to the embodiment above as long as there is no inconsistency. Note that the scope of the present invention is not limited to these embodiments.

(1) In the above-described embodiment, the abutting-target portions 45 are members that are separate from the hood stays 24, and are fixed (e.g. fixed by welding) to the hood stays 24. Alternatively, the abutting-target portions 45 may be formed integrally with the hood stays 24.

(2) In the above-described embodiment, the front attachment stays 37 abut against the abutting-target portions 45 from the rear side, and thus the engine E is prevented from swinging forward. Alternatively, other portions on the engine E side may abut against the abutting-target portions 45 from the rear side, and thus the engine E may be prevented from swinging forward.

Figure 15:
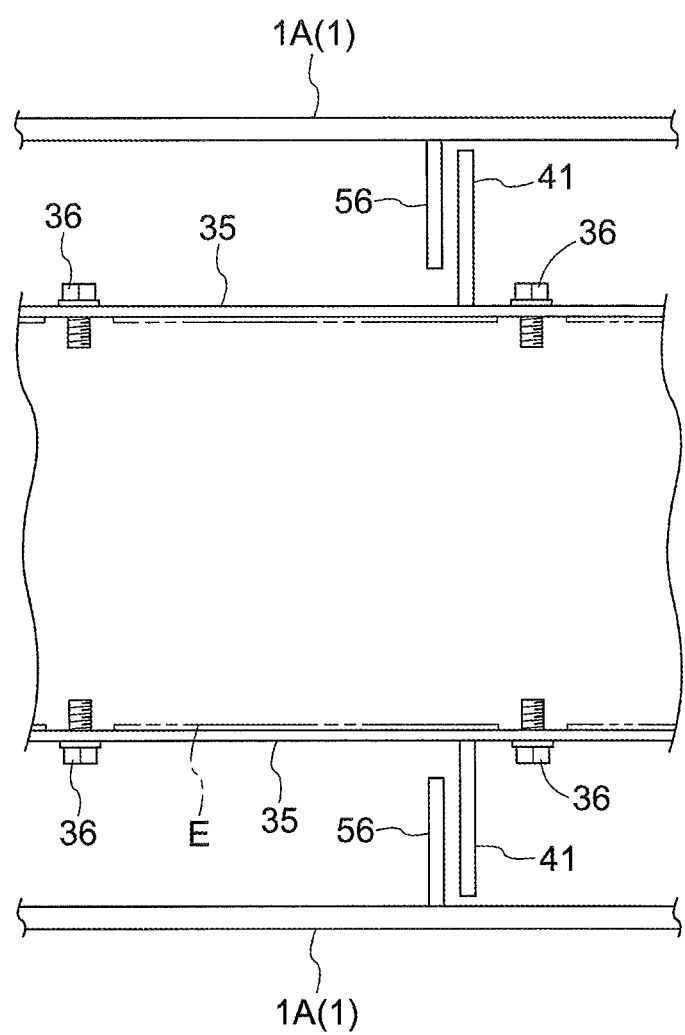
FIG. 15 is a plan view showing a forward-pivot stopper plate according to another embodiment.

(3) As shown in FIG. 15, forward-pivot stopper plates 56 may be respectively provided forward of the left lateral-pivot stopper plate 41 and forward of the right lateral-pivot stopper plate 41. If this is the case, the left forward-pivot stopper plate 56 can be fixed to the right surface of the left main frame 1A (the surface inside the vehicle body) so as to protrude rightward, and the right forward-pivot stopper plate 56 can be fixed to the left surface of the right main frame 1A (the surface inside the vehicle body) so as to protrude leftward. With such a configuration, when the engine E swings forward via the mounting rubbers 22, the lateral-pivot stopper plates 41 abut against the forward-pivot stopper plates 56 from the rear side, and thus the engine E is prevented from swinging forward. Thus, the front portion of the engine E can be prevented from coming into contact with the hood 3.

(4) The configuration according to the first embodiment is also applicable to a tractor without a mower attached thereto, other than a tractor in use with a mower.

Second Embodiment

The following describes a second embodiment with reference to FIGS. 16 to 24.

Overall Configuration of Tractor

Figure 16:
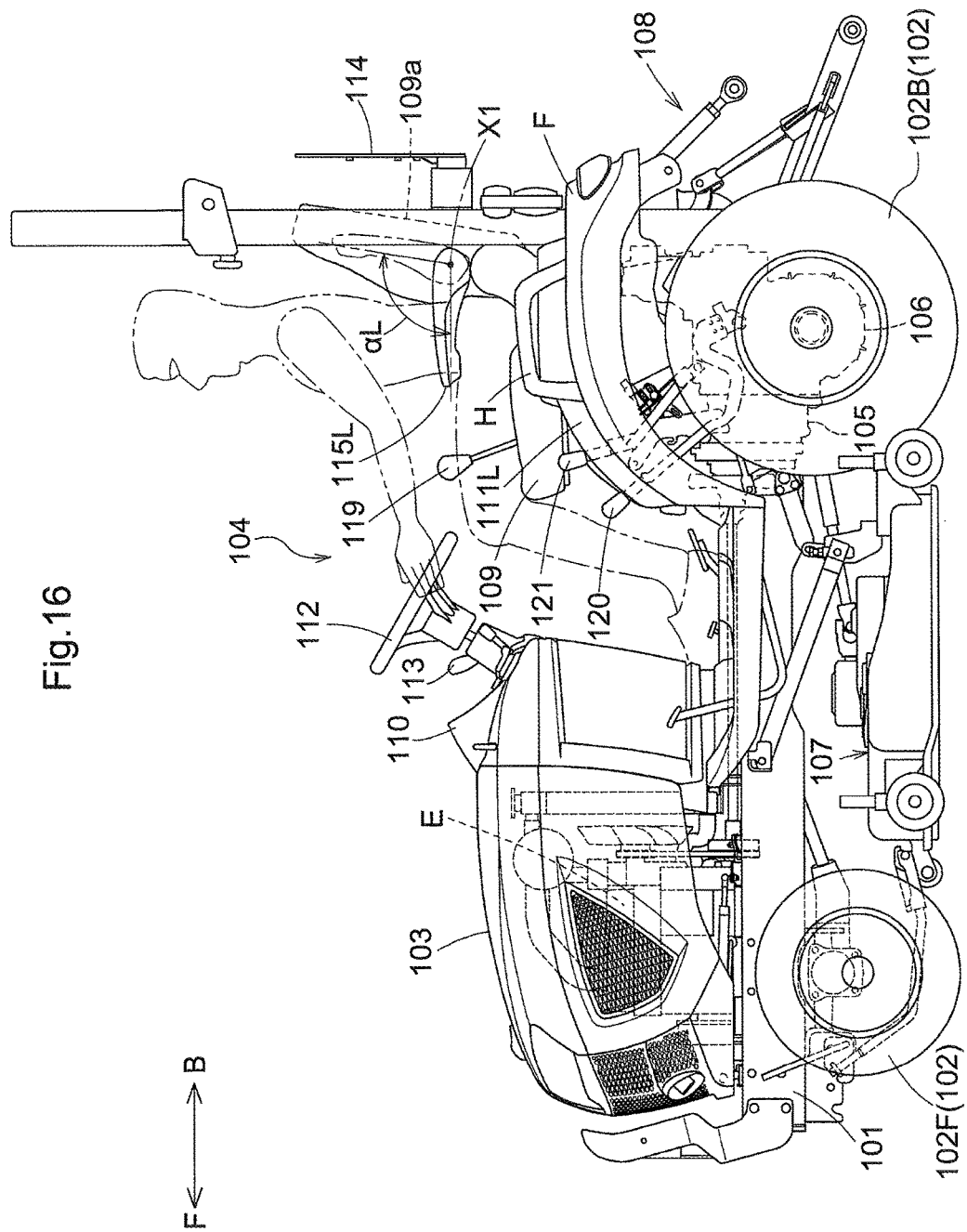
FIG. 16 shows a second embodiment (the same applies to the following drawings up to FIG. 24), in particular a left side view showing a tractor.
Figure 17:
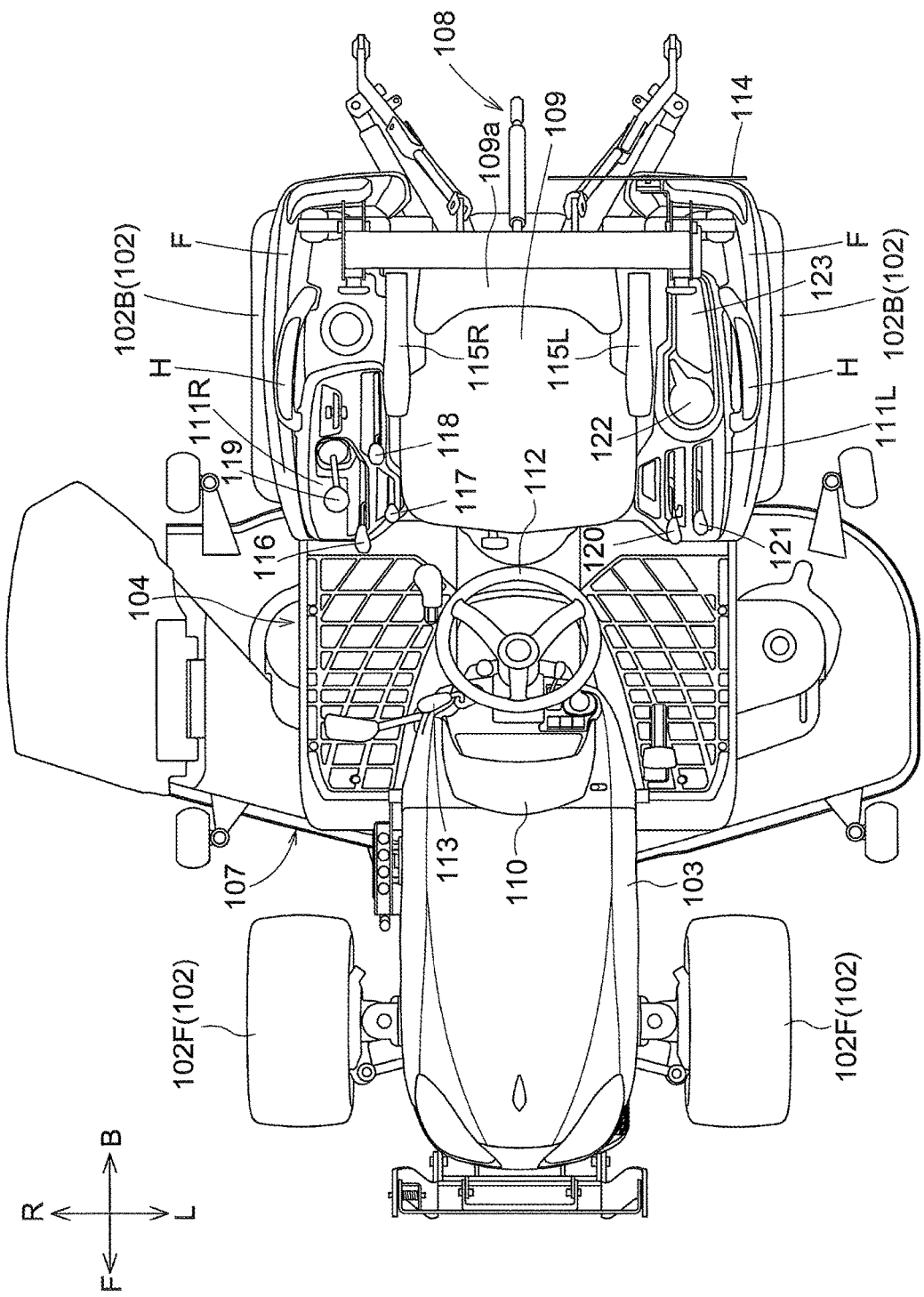
FIG. 17 is a plan view showing the tractor.
Figure 18:
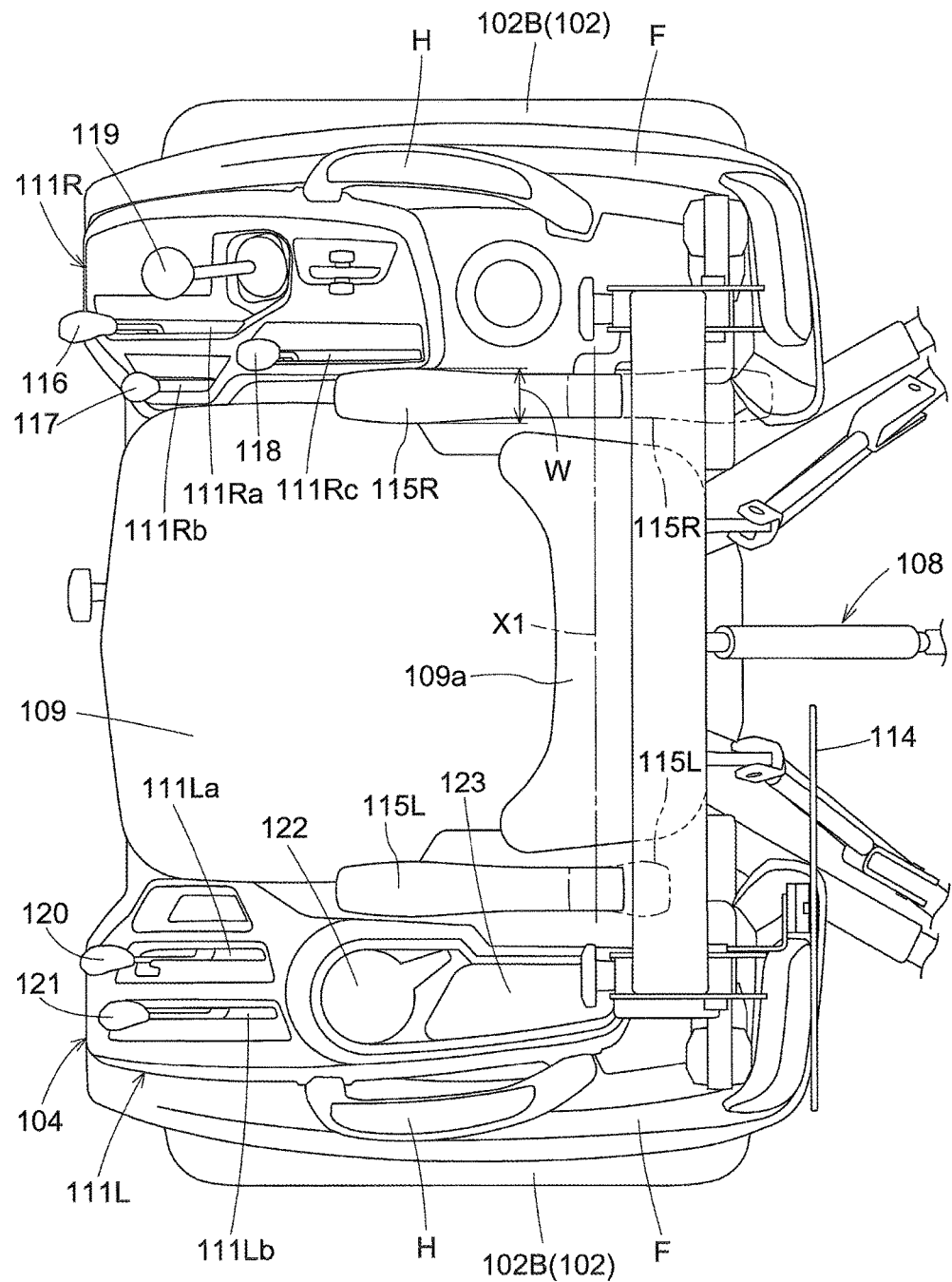
FIG. 18 is a plan view showing an area around a driver's seat.
Figure 19:
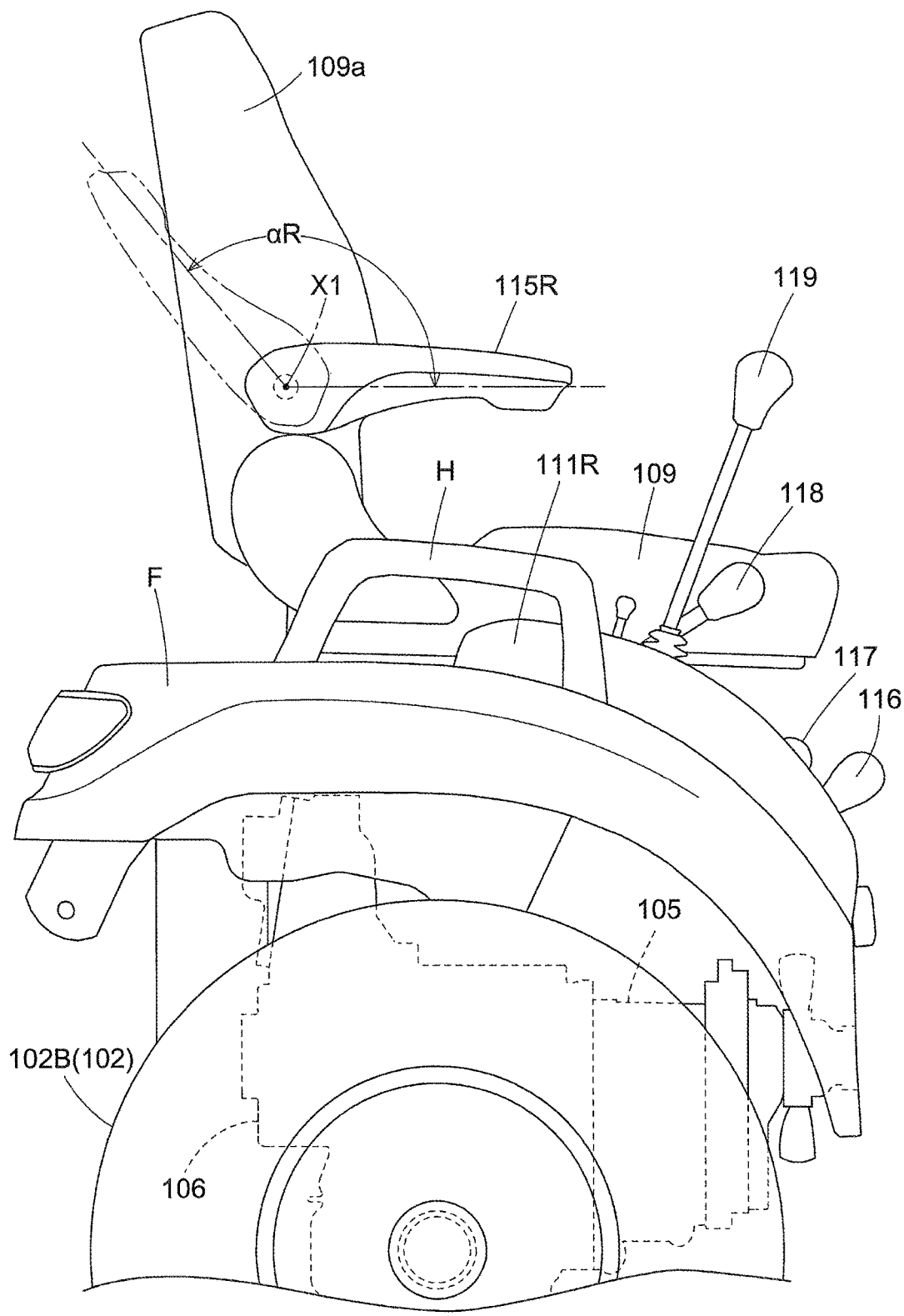
FIG. 19 is a right side view showing an area around the driver's seat.

FIGS. 16 and 17 show a tractor (corresponding to "work vehicle"). This tractor includes: a vehicle body frame 101; and a wheel type travelling apparatus 102 that supports the vehicle body frame 101. The travelling apparatus 102 includes: a pair of right and left front wheels 102F that are steerable and drivable; and a pair of right and left rear wheels 102B that are drivable. A pair of right and left fenders F that cover the rear wheels 102B are provided. The fenders F are provided with handrails H that serve as handles when the driver gets on and off the tractor, for example.

A hood 103 is provided at a front half portion of the vehicle body frame 101. An engine E is housed in the hood 103. A driving section 104 is provided at a rear half portion of the vehicle body frame 101. The driving section 104 includes: a hydrostatic continuously variable transmission apparatus 105 that serves as a main transmission apparatus; and a transmission case 106. The transmission case 106 houses, for example, a gear type transmission apparatus (not shown) that serves as an auxiliary transmission apparatus.

A front loader (not shown) can be attached to the tractor. A mower 107 is provided between the front wheels 102F and the rear wheels 102B below the vehicle body frame 101 such that the mower 107 can be raised and lowered. A rear end of the vehicle body frame 101 includes a linkage mechanism 108 to which a work implement (not shown) such as a rotary plowing apparatus can be attached.

In order to drive the mower 107, the driving force of the engine E can be taken from a mid PTO shaft (not shown). In order to drive the work implement, the driving force of the engine E can be taken from a rear PTO shaft (not shown). A PTO clutch (not shown) that can be switched to a transmission state and a blocking state is provided. When in the transmission state, the PTO clutch transmits the driving force of the engine E to the rear and mid PTO shafts, and when in the blocking state, the PTO clutch blocks the driving force of the engine E from being transmitted to the rear and mid PTO shafts.

Driving Section

As shown in FIGS. 16 to 19, the driving section 104 includes: a driver's seat 109 on which the driver can sit; a front panel 110; a right lever guide 111R (corresponding to "first lever guide"); and a left lever guide 111L (corresponding to "second lever guide"). The front panel 110 includes: a steering wheel 112 to steer the vehicle body; and an accelerator lever 113 to change the number of revolutions of the engine E. A warning reflector 114 for providing a warning rearward of the vehicle is provided rearward and to the left of the driver's seat 109.

The driver's seat 109 includes: a left armrest 115L (corresponding to "armrest on the other side"); and a right armrest 115R (corresponding to "armrest on one side"). The driver seated on the driver's seat 109 can put his/her left arm on the left armrest 115L and his/her right arm on the right armrest 115R. The left armrest 115L and the right armrest 115R are pivotable in a top-bottom direction about a rear pivot X1, between their respective operative positions and retracted positions. At the operative positions, the left armrest 115L and the right armrest 115R extend in the front-rear direction of the vehicle body, and at the retracted positions, the left armrest 115L and the right armrest 115R extend in a top-bottom direction. A pivotable angle ($\alpha R$) of the right armrest 115R is set to be greater than a pivotable angle ($\alpha L$) of the left armrest 115L such that the right armrest 115R is located rearward of the left armrest 115L when they are at the retracted positions.

The left lever guide 111L is provided on the upper surface of the left fender F. In other words, the left lever guide 111L is provided on the side on which the left armrest 115L is located in the right-left direction of the vehicle body, with respect to the driver's seat 109. The left lever guide 111L includes: a PTO clutch lever 120 to switch the PTO clutch; and a PTO selection lever 121 to select a PTO shaft that is to be driven.

A drink holder 122 and a storage section 123 are formed integrally with a rear half portion of the left lever guide 111L. The drink holder 122 and the storage section 123 are arranged adjacent to each other in the front-rear direction of the vehicle body such that the drink holder 122 is located on the front side and the storage section 123 is located on the rear side.

A guide groove 111La for guiding the PTO clutch lever 120, and a guide groove 111Lb for guiding the PTO selection lever 121, are formed in the left lever guide 111L so as to extend in the front-rear direction of the vehicle body. The guide grooves 111La and 111Lb correspond to "second guide groove".

The right lever guide 111R is provided on the upper surface of the right fender F. In other words, the right lever guide 111R is provided on the side in the right-left direction of the vehicle body, on which the right armrest 115R is located, with respect to the driver's seat 109. The right lever guide 111R includes: an auxiliary transmission lever 116 to shift the auxiliary transmission apparatus; a switching lever 117 to switch the travelling apparatus 102 to a four wheel drive state and a two wheel drive state; an up/down lever 118 to raise and lower the work implement; and an operation lever 119 to operate the front loader.

A guide groove 111Ra for guiding the auxiliary transmission lever 116, a guide groove 111Rb for guiding the switching lever 117, and a guide groove 111Rc for guiding the up/down lever 118 are formed in the right lever guide 111R so as to extend in the front-rear direction of the vehicle body. The guide grooves 111Ra, 111Rb, and 111Rc correspond to "first guide groove".

In plan view, the guide groove 111Rb is located forward of the right armrest 115R, within the range of a width (a length in the right-left direction of the vehicle body) W of the right armrest 115R. In other words, in plan view, the right armrest 115R is located on an extension of the trajectory of motion of the switching lever 117 that moves in a front-rear direction along the guide groove 111Rb. The guide groove 111Rc extends further rearward compared to the guide grooves 111La and 111Lb. Specifically, the guide groove 111Rc extends rearward so as to overlap the range in which the right armrest 115R at the operative position exists, in the front-rear direction of the vehicle body.

Right Armrest

Figure 20:
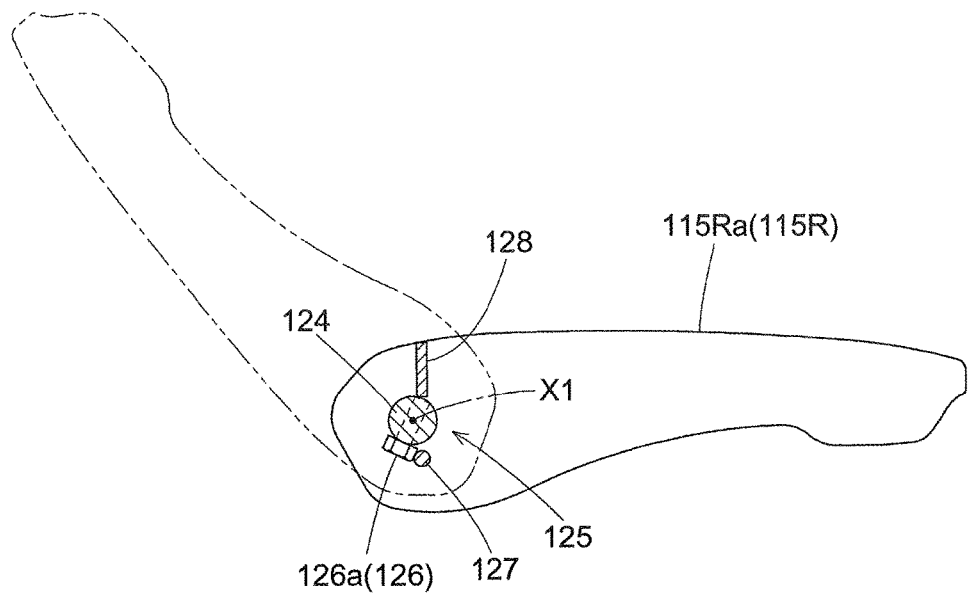
FIG. 20 is a right side view showing a right armrest at an operative position.
Figure 21:
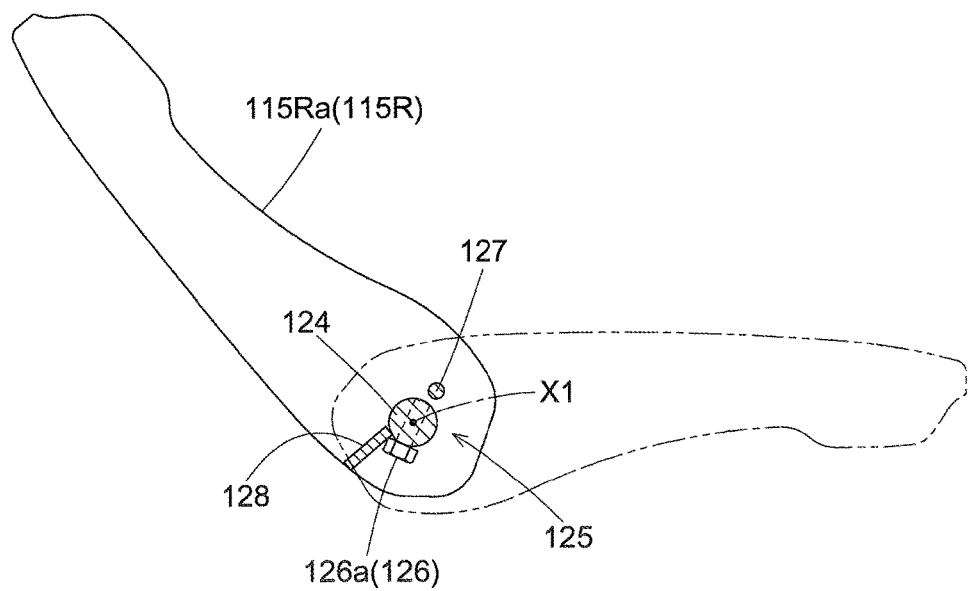
FIG. 21 is a right side view showing the right armrest at a retracted position.

Next, a structure for pivoting the right armrest 115R will be described with reference to FIGS. 20 and 21. In FIG. 20, the right armrest 115R at the operative position is represented as a solid line. In FIG. 21, the right armrest 115R at the retracted position is represented as a solid line. Note that the structure for pivoting the right armrest 115R and the structure for pivoting the left armrest 115L are basically the same, except for their pivotable angles.

The right armrest 115R is supported by a support shaft 124 so as to be pivotable. The right armrest 115R includes:

an armrest frame (not shown) that is a framework; and an armrest pad 115Ra that covers the armrest frame.

A positioning mechanism 125 that positions the right armrest 115R at the operative position and the retracted position is provided. The positioning mechanism 125 includes: a bolt 126; a first abutting portion 127; and a second abutting portion 128. The bolt 126 penetrates through the support shaft 124 in a direction that is orthogonal to the shaft. The first abutting portion 127 and the second abutting portion 128 are provided inside the right armrest 115R.

As shown in FIG. 20, the first abutting portion 127 abuts against a head portion 126a of the bolt 126, and thus the right armrest 115R is positioned at the operative position. As shown in FIG. 21, the second abutting portion 128 abuts against the head portion 126a of the bolt 126, and thus the right armrest 115R is positioned at the retracted position. The right armrest 115R at the retracted position protrudes to a position that is rearward of the rear surface of a backrest portion 109a of the driver's seat 109 (see FIG. 19).

With this characteristic configuration, the pivotable angle ($\alpha$R) of the right armrest 115R is set to be greater than the pivotable angle ($\alpha$L) of the left armrest 115L such that the right armrest 115R is located rearward of the left armrest 115L when they are at their respective retracted positions. Therefore, when a lever operation is performed using the auxiliary transmission lever 116, the switching lever 117, the up/down lever 118, and so on in a situation where the right armrest 115R has been switched to the retracted position, it is unlikely that the driver's elbow will come into contact with the right armrest 115R.

Also, as described above, the warning reflector 114 is provided rearward and to the left of the driver's seat 109, and the pivotable angle ($\alpha$L) of the left armrest 115L is set to be smaller than the pivotable angle ($\alpha$R) of the right armrest 115R. Therefore, there is no risk of the right armrest 115R at the retracted position coming into contact with the warning reflector 114.

Structure for Attaching Safety Switch

Figure 22:
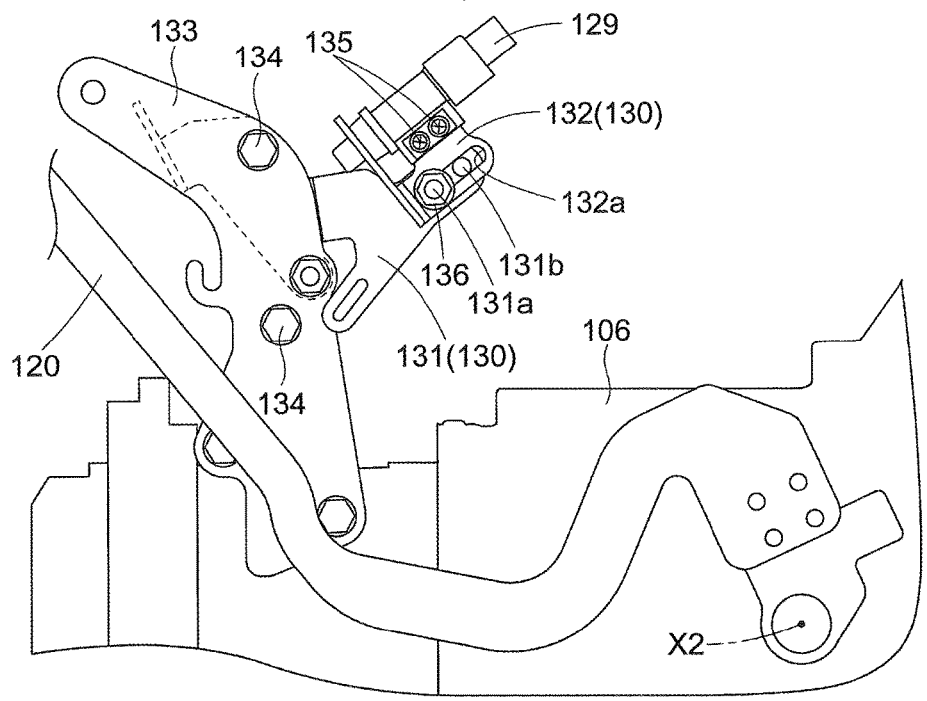
FIG. 22 is a left side view showing a structure for attaching a safety switch.
Figure 23:
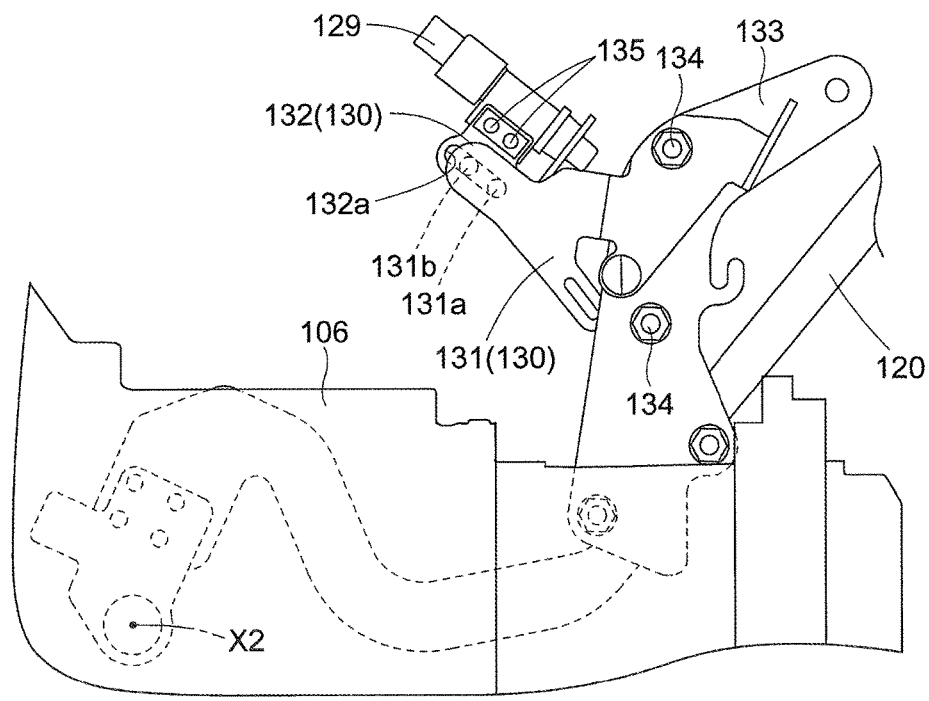
FIG. 23 is a right side view showing the structure for attaching the safety switch.

As shown in FIGS. 22 and 23, the PTO clutch lever 120 is pivotable about a pivot axis X2 that extends in the right-left direction of the vehicle body, between an ON position and an OFF position. When the PTO clutch lever 120 is at the ON position, the PTO clutch is in the transmission state, and when the PTO clutch lever 120 is at the OFF position, the PTO clutch is in the blocking state. A safety switch 129 for detecting that the PTO clutch lever 120 is at the OFF position is provided. The tractor is configured such that the engine E cannot be started when the PTO clutch lever 120 is at the ON position.

A support stay 130 is provided to support the safety switch 129. The support stay 130 includes a first stay 131 and a second stay 132. The first stay 131 is fixed to a seat stay 133 that supports the driver's seat 109, using bolts 134. The safety switch 129 is fixed to the second stay 132 using bolts 135.

A weld bolt 131a and a headed pin 131b protrude leftward from the first stay 131. The second stay 132 includes an elongated hole 132a into which the weld bolt 131a and the headed pin 131b are inserted. The position of the second stay 132 can be adjusted along the elongated hole 132a, with the weld bolt 131a and the headed pin 131b being inserted into the elongated hole 132a. The first stay 131 and the second stay 132 can be fixed to each other using a nut 136, with the weld bolt 131a and the headed pin 131b being inserted into the elongated hole 132a. With this configuration, there is no risk of the second stay 132 rotating relative to the first stay 131 or moving along the elongated hole 132a.

Structure for Attaching Accelerator Lever

Figure 24:
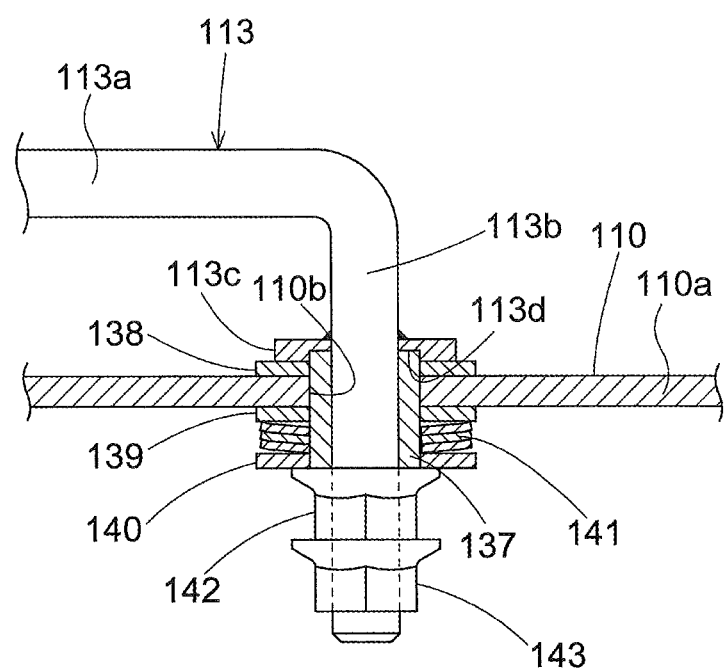
FIG. 24 shows a structure for attaching an accelerator lever.

As shown in FIG. 24, the accelerator lever 113 is attached to a plate-like portion (plate portion) 110a of the front panel 110. The accelerator lever 113 includes a handle portion 113a and an attaching shaft portion 113b. The attaching shaft portion 113b includes a flange portion 113c. A collar 137 is fitted onto a portion of the attaching shaft portion 113b that is located opposite the handle portion 113a with respect to the flange portion 113c (i.e. a portion on the top end side). The flange portion 113c includes a fitting groove 113d into which an end of the collar 137 can be fitted. The plate portion 110a includes an attaching hole 110b into which the collar 137 can be inserted.

A first washer 138, a second washer 139 and a third washer 140 are fitted onto the collar 137. The first washer 138 and the second washer 139 sandwich the plate portion 110a from two sides. A spring washer 141 is fitted onto a portion of the collar 137 between the second washer 139 and the third washer 140. A first nut 142 and a second nut 143 are fitted (screwed) onto a portion of the attaching shaft portion 113b that is closer to the top end than the collar 137.

With such a configuration, the collar 137, which has been inserted into the attaching hole 110b, is sandwiched between the flange portion 113c and the first nut 142 upon the first nut 142 being fastened with a predetermined torque. Then, the spring washer 141 is compressed, an axial force is applied to the accelerator lever 113, and a frictional force is generated between the plate portion 110a on one hand and the first washer 138 and the second washer 139 on the other hand. Also, the second nut 143 is fastened to prevent the first nut 142 from becoming loose. In this way, it is possible to uniformly set the operational force (the rotational torque) of the accelerator lever 113 by only fastening the first nut 142, and it is also possible to reduce the time required for adjusting the rotational torque.

Summary of Second Embodiment

The above-described work vehicle includes:

a driver's seat 109 on which a driver can sit; and a pair of right and left armrests 115L and 115R on which the driver seated on the driver's seat 109 can put his/her arms, wherein the armrests 115L and 115R are pivotable in a top-bottom direction about a rear pivot X1, between their respective operative positions at which the left armrest 115L and the right armrest 115R extend in the front-rear direction of the vehicle body and retracted positions at which the left armrest 115L and the right armrest 115R extend in a top-bottom direction, and a pivotable angle ($\alpha$R) of the armrest 115R on one side is set to be greater than a pivotable angle ($\alpha$L) of the armrest 115L on the other side such that the armrest 115R on one side is located rearward of the armrest 115L on the other side when they are at their respective retracted positions.

The armrest 115R on one side at the retracted position protrudes to a position that is rearward of a rear surface of a backrest portion 109a of the driver's seat 109.

The work vehicle further includes:

a first lever guide (a right lever guide 111R) that is provided on a side in a right-left direction of the vehicle body, on which the armrest 115R on one side is located, with respect to the driver's seat 109; and a second lever guide (a left lever guide 111L) that is provided on a side in the right-left direction of the vehicle body, on which the armrest 115L on the other side is located, with respect to the driver's seat 109, wherein the first lever guide includes a first guide groove that extends in the front-rear direction of the vehicle body to guide a lever, the second lever guide includes a second guide groove that extends in the front-rear direction of the vehicle body to guide a lever, and the first guide groove extends further rearward compared to the second guide groove.

In plan view, the first guide groove is located forward of the armrest 115R on one side, within a range of a width (W) of the armrest 115R on one side.

Other Embodiments Related to Second Embodiment

The following describes other embodiments. Two or more of the other embodiments below may be combined and applied to the embodiment above as long as there is no inconsistency. Note that the scope of the present invention is not limited to these embodiments.

(1) In the above-described embodiment, the pivotable angle (αR) of the right armrest 115R is set to be greater than the pivotable angle (αL) of the left armrest 115L such that the right armrest 115R is located rearward of the left armrest 115L when they are at their respective retracted positions. Alternatively, the pivotable angle (αL) of the left armrest 115L may be set to be greater than the pivotable angle (αR) of the right armrest 115R such that the left armrest 115L is located rearward of the right armrest 115R when they are at their respective retracted positions. If this is the case, the warning reflector 114 is to be provided rearward and to the right of the driver's seat 109 instead of rearward and to the left of the driver's seat 109.

(2) In the above-described embodiment, the right armrest 115R at the retracted position protrudes rearward to a position that is rearward of the rear surface of the backrest portion 109a of the driver's seat 109. Alternatively, the right armrest 115R at the retracted position may be configured not to protrude rearward to a position that is rearward of the rear surface of the backrest portion 109a of the driver's seat 109.

(3) The configuration according to the second embodiment is also applicable to a combine and a rice transplanter, in addition to a tractor. This configuration is applicable to a construction work vehicle, in addition to a farm work vehicle.

Third Embodiment

The following describes a third embodiment with reference to FIGS. 25 to 31.

Overall Configuration of Tractor

Figure 25:
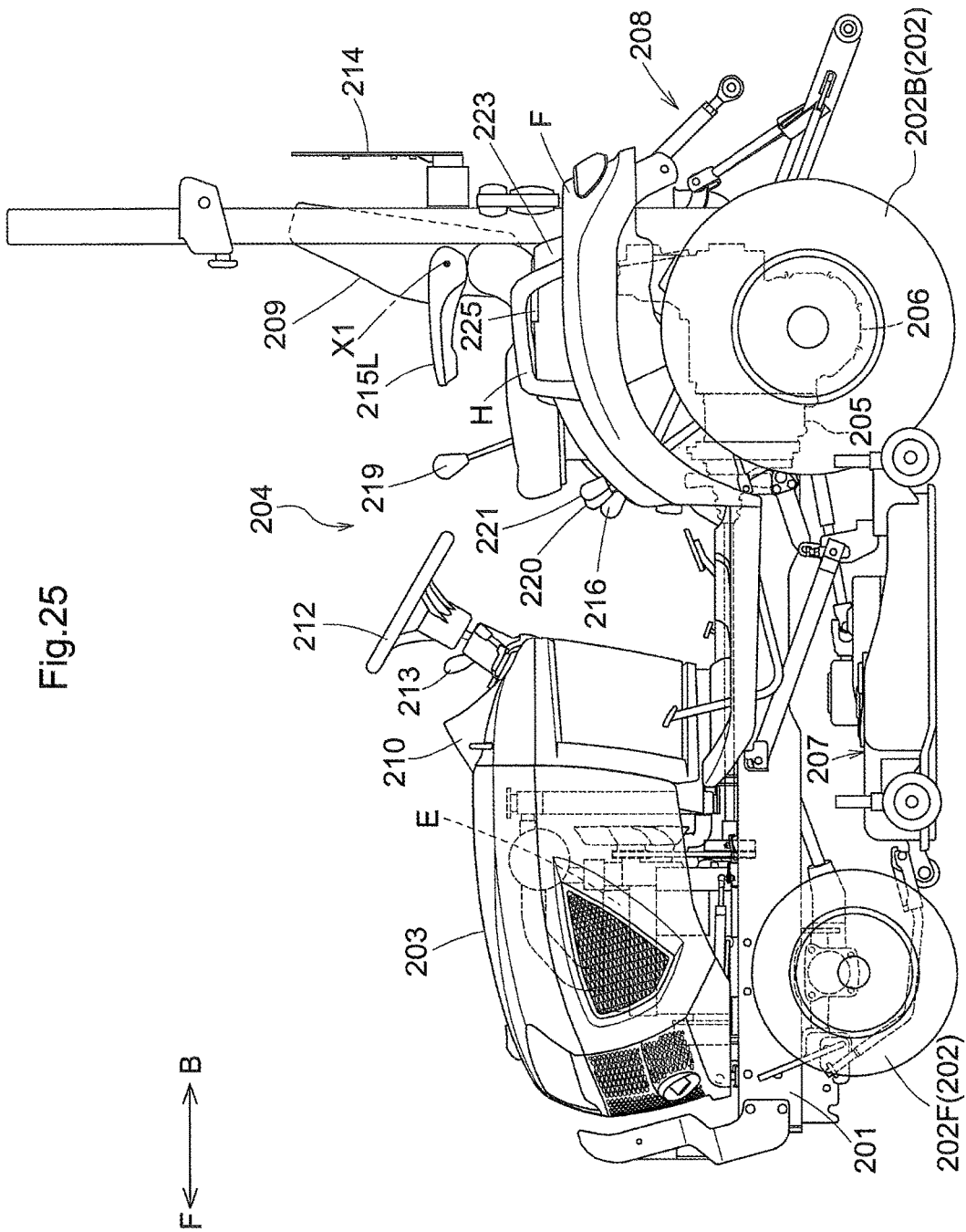
FIG. 25 shows a third embodiment (the same applies to the following drawings up to FIG. 31), in particular a left side view showing a tractor.
Figure 26:
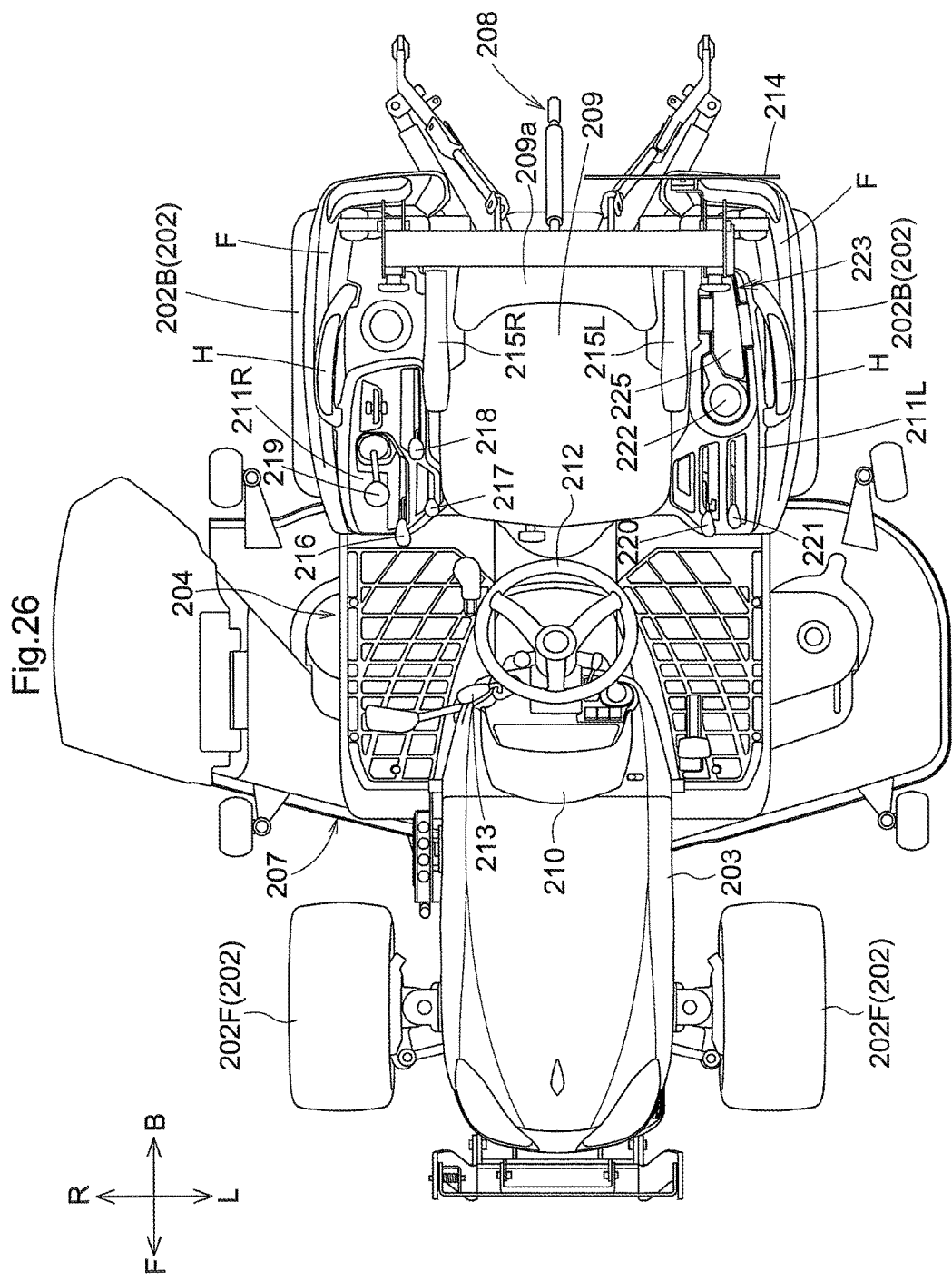
FIG. 26 is a plan view showing the tractor.
Figure 27:
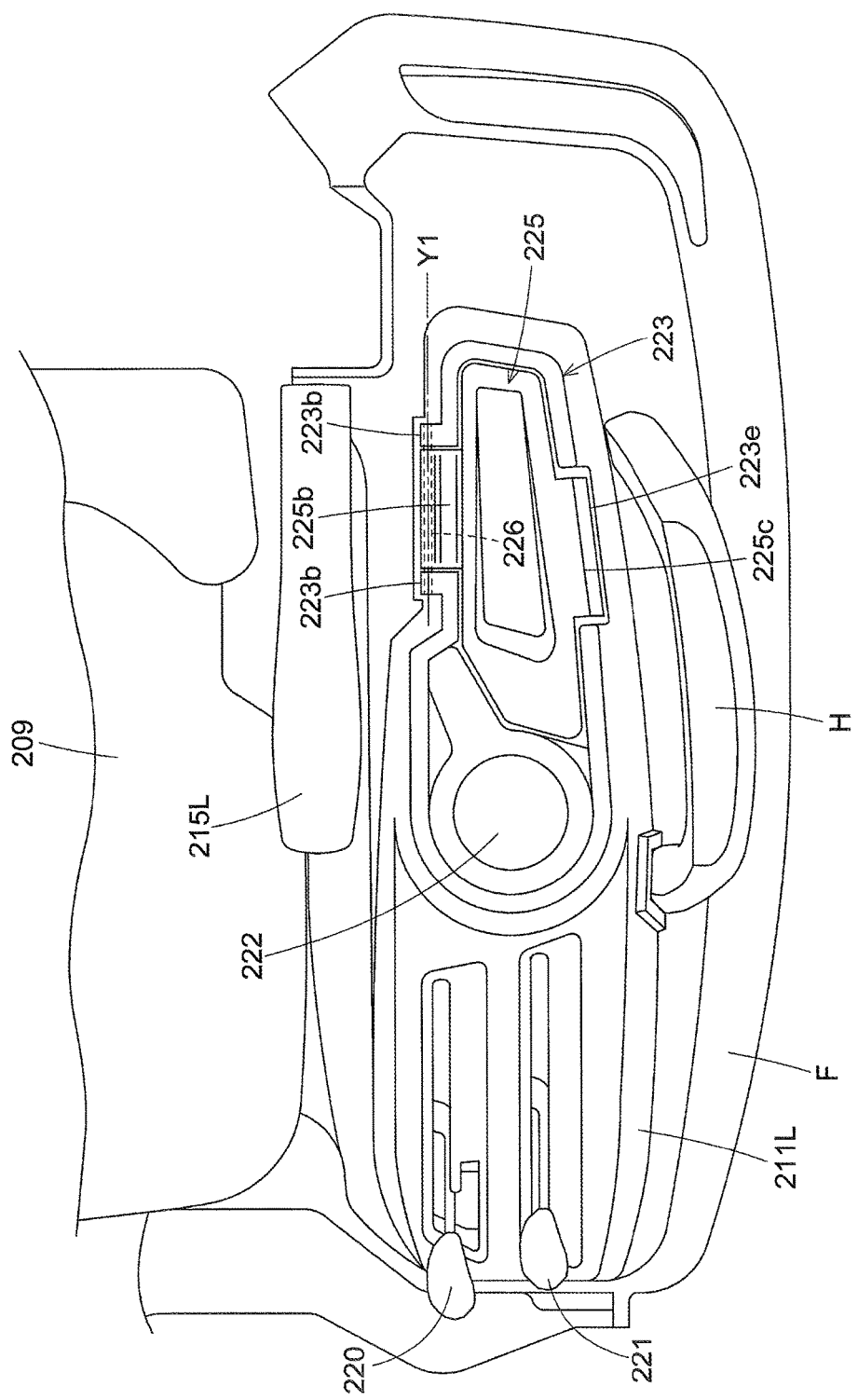
FIG. 27 is a plan view showing a left lever guide.
Figure 28:
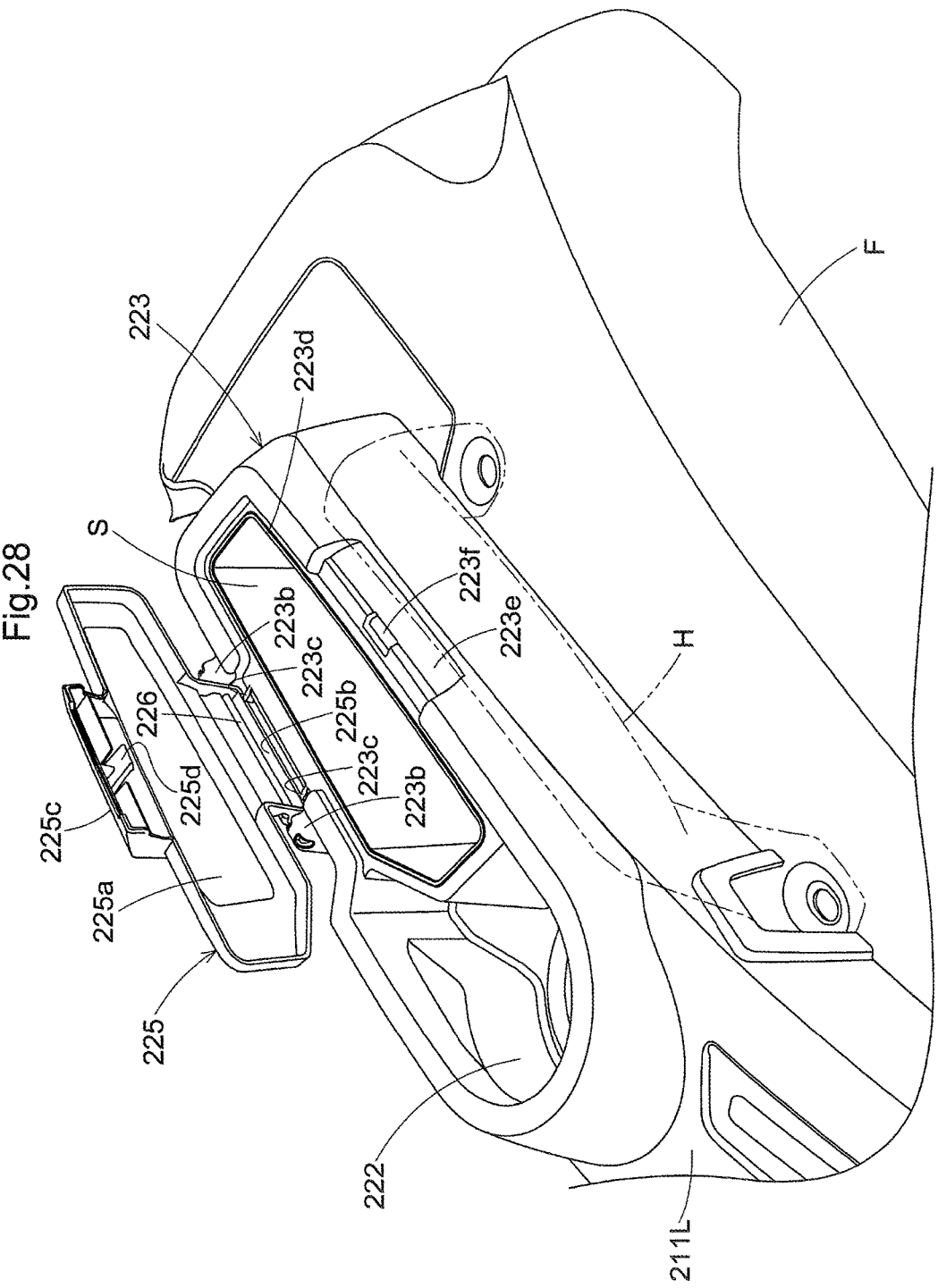
FIG. 28 is a front perspective view showing a storage section.
Figure 29:
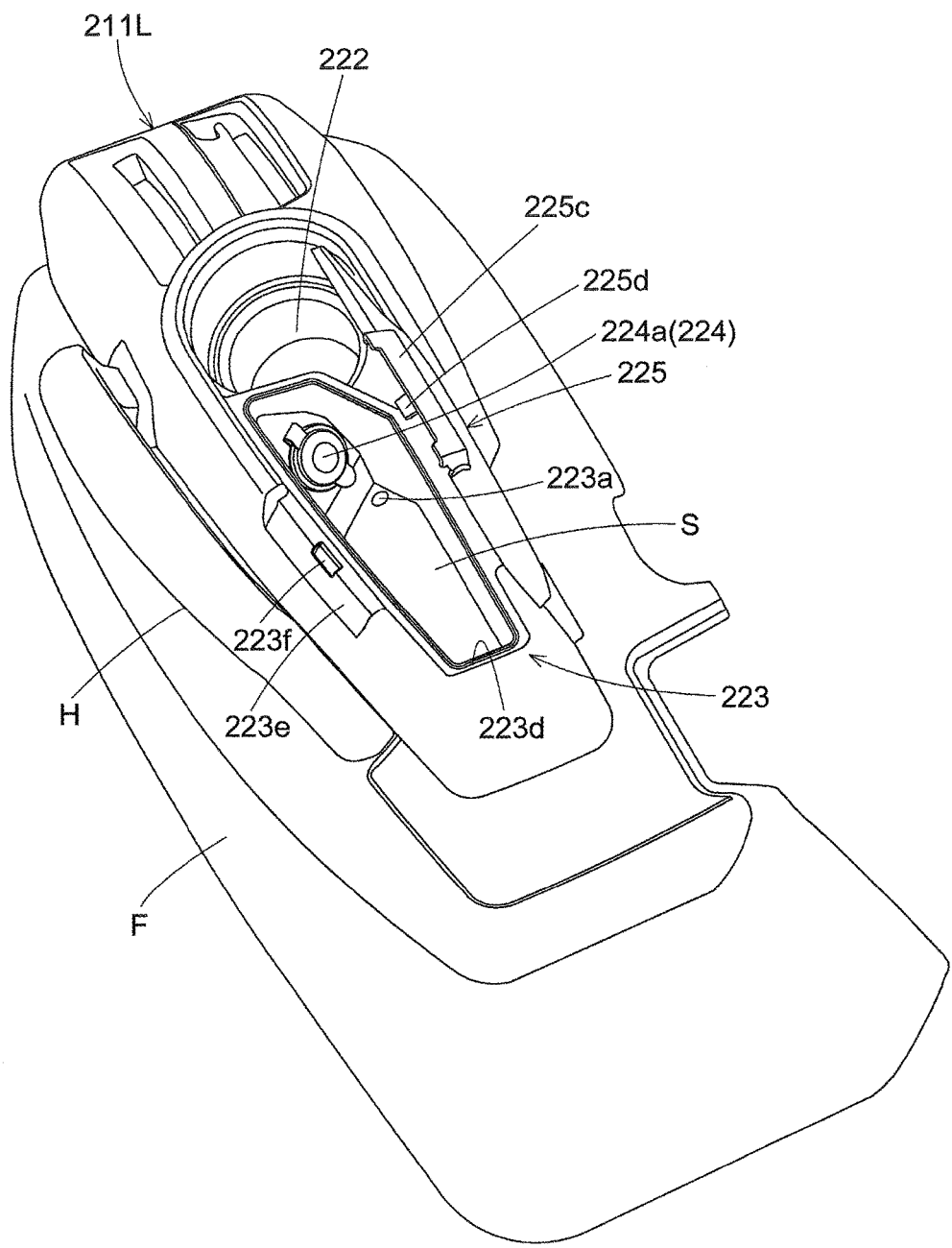
FIG. 29 is a rear perspective view showing the storage section.
Figure 30:
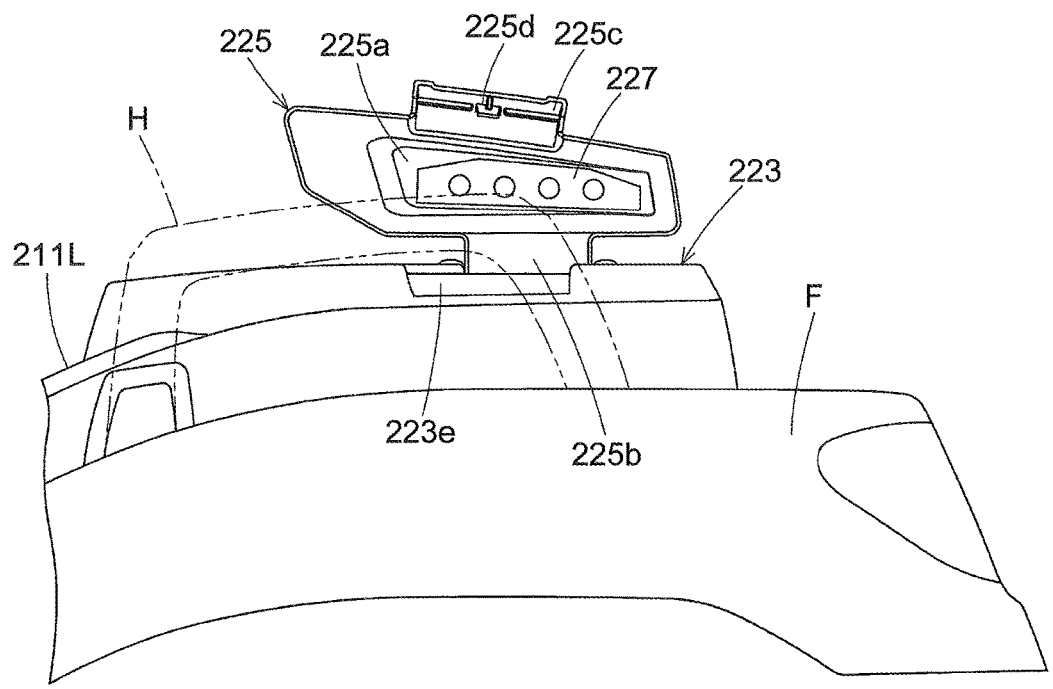
FIG. 30 is a left side view showing the storage section.
Figure 31:
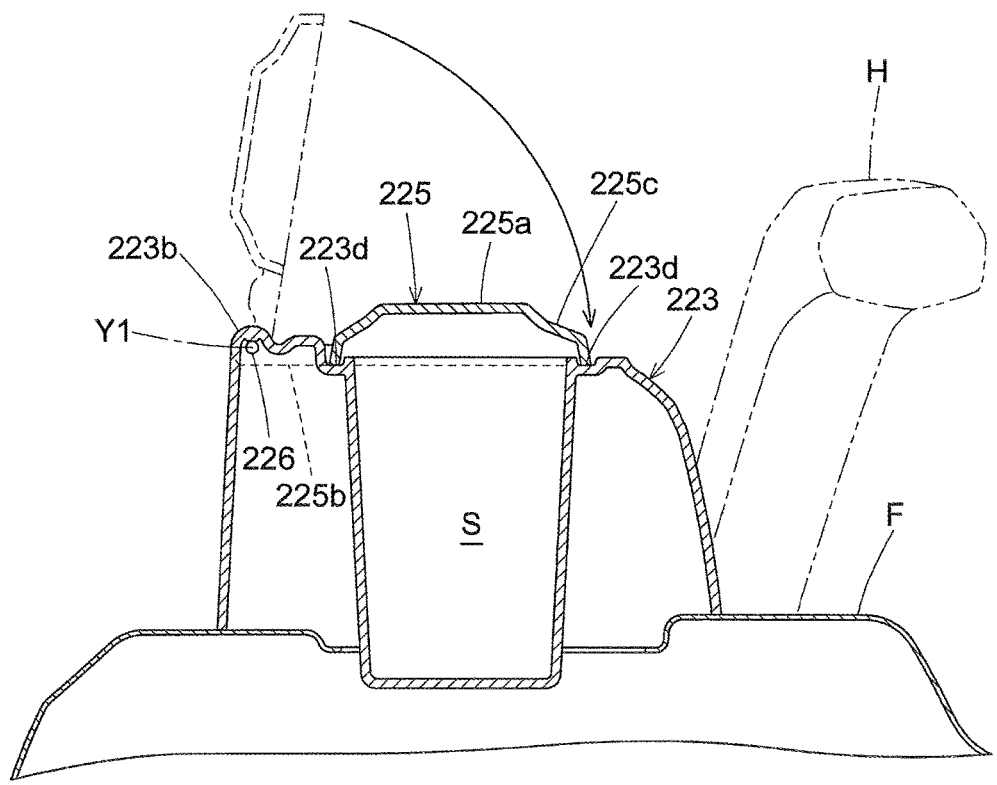
FIG. 31 is a front cross-sectional view showing the storage section.

FIGS. 25 and 26 show a tractor (corresponding to "work vehicle"). This tractor includes: a vehicle body frame 201; and a wheel type travelling apparatus 202 that supports the vehicle body frame 201. The travelling apparatus 202 includes: a pair of right and left front wheels 202F that are steerable and drivable; and a pair of right and left rear wheels 202B that are drivable. A pair of right and left fenders F that cover the rear wheels 202B are provided. The fenders F are provided with handrails H that serve as handles when the driver gets on and off the tractor, for example.

A hood 203 is provided at a front half portion of the vehicle body frame 201. An engine E is housed in the hood 203. A driving section 204 is provided at a rear half portion of the vehicle body frame 201. The driving section 204 includes: a hydrostatic continuously variable transmission apparatus 205 that serves as a main transmission apparatus; and a transmission case 206. The transmission case 206 houses, for example, a gear type transmission apparatus (not shown) that serves as an auxiliary transmission apparatus.

A front loader (not shown) can be attached to the tractor. A mower 207 is provided between the front wheels 202F and the rear wheels 202B below the vehicle body frame 201 such that the mower 207 can be raised and lowered. A rear end of the vehicle body frame 201 includes a linkage mechanism 208 to which a work implement (not shown) such as a rotary plowing apparatus can be attached.

In order to drive the mower 207, the driving force of the engine E can be taken from a mid PTO shaft (not shown). In order to drive the work implement, the driving force of the engine E can be taken from a rear PTO shaft (not shown). A PTO clutch (not shown) that can be switched to a transmission state and a blocking state is provided. When in the transmission state, the PTO clutch transmits the driving force of the engine E to the rear and mid PTO shafts, and when in the blocking state, the PTO clutch blocks the driving force of the engine E from being transmitted to the rear and mid PTO shafts.

Driving Section

As shown in FIGS. 25 and 26, the driving section 204 includes: a driver's seat 209 on which the driver can sit; a front panel 210; a right lever guide 211R; and a left lever guide 211L. The front panel 210 includes: a steering wheel 212 to steer the vehicle body; and an accelerator lever 213 to change the number of revolutions of the engine E. A warning reflector 214 for providing a warning rearward of the vehicle is provided rearward and to the left of the driver's seat 209.

The driver's seat 209 includes a left armrest 215L and a right armrest 215R. The driver seated on the driver's seat 209 can put his/her left arm on the left armrest 215L and his/her right arm on the right armrest 215R. The left armrest 215L and the right armrest 215R are pivotable in a top-bottom direction about a rear pivot X1, between their respective operative positions at which the left armrest 215L and the right armrest 215R extend in the front-rear direction of the vehicle body, and retracted positions at which the left armrest 215L and the right armrest 215R extend in a top-bottom direction.

The left lever guide 211L is provided on the upper surface of the left fender F. The left lever guide 211L includes: a PTO clutch lever 220 to switch the PTO clutch; and a PTO selection lever 221 to select a PTO shaft that is to be driven.

A drink holder 222 and a storage section 223 are formed integrally with a rear half portion of the left lever guide 211L. The drink holder 222 and the storage section 223 are arranged adjacent to each other in the front-rear direction of the vehicle body such that the drink holder 222 is located on the front side and the storage section 223 is located on the rear side.

The right lever guide 211R is provided on the upper surface of the right fender F. The right lever guide 211R includes: an auxiliary transmission lever 216 to shift the auxiliary transmission apparatus; a switching lever 217 to switch the travelling apparatus 202 to a four wheel drive state and a two wheel drive state; an up/down lever 218 to raise and lower the work implement; and an operation lever 219 to operate the front loader.

Storage Section

As shown in FIGS. 27 to 31, the storage section 223 is located on the left side of the driver's seat 209 so as to be adjacent thereto. The storage section 223 includes a storage space S that is recessed downward. The storage space S is elongated in the front-rear direction of the vehicle body, and a lateral cross section thereof has the shape of an inverted trapezoid (a trapezoid whose upper base is longer than the lower base). The lower base of the storage section 223 is gently inclined downward in a forward direction. A water removal hole 223a is formed in a front end of the lower base of the storage section 223.

Direct Current Outlet

A direct current outlet 224 (a so-called accessory socket) is provided in the storage space S. It is possible to take direct current power at a predetermined voltage (e.g. 12 V) from the direct current outlet 224. The direct current outlet 224 is provided in the storage space S at a position that is on the front side, specifically, in a front end of the storage space S (an end on the drink holder 222 side). The direct current outlet 224 is located so as to face rearward and to the right, and upward, i.e. so as to face the driver who is seated on the driver's seat 209. A waterproof/dustproof cap 224a is attached to the direct current outlet 224.

Lid Member

A lid member 225 can be switched to an open state in which the lid member 225 exposes the storage space S to the outside, and the closed state in which the lid member 225 covers the storage space S from above. If the lid member 225 is closed, there is no risk of dust entering the storage space S. Therefore, it is possible to prevent dust from accumulating in the storage section 223 by closing the lid member 225. The lid member 225 is pivotable about a pivot axis Y1 that extends in the front-rear direction of the vehicle body, between an open position corresponding to the open state and a closed position corresponding to the closed state. The pivot axis Y1 is located on the driver's seat 209 side relative to the storage section 223, i.e. on the side that is opposite the left handrail H relative to the storage section 223. The lid member 225 is supported on a right portion of the storage section 223 so as to be pivotable, with a support shaft 226 being interposed therebetween.

The lid member 225 is constituted by a member that is made of resin, and has a shape that is slightly greater than the shape of the storage space S in plan view. A recessed portion 225a that is recessed toward the side that is opposite the side that faces the storage space S is formed in the lid member 225. A description label 227 (a caution label) for the direct current outlet 224 is attached to a portion of the recessed portion 225a on the side that faces the storage space S. For example, a notice concerning the handling of the direct current outlet 224 may be written on the description label 227. Note that the shape of the description label 227 is not limited to the shape shown in FIG. 30.

An edge portion of the lid member 225 on the pivot axis Y1 side includes an attaching portion 225b to which the support shaft 226 is attached. An edge portion of the lid member 225 on the side that is opposite the pivot axis Y1 includes a handle portion 225c that serves as a handle to open and close the lid member 225. A portion of the handle portion 225c on the side that faces the storage space S includes a claw portion 225d.

A right portion of the storage section 223 includes a pair of front and rear supporting portions 223b by which the storage section 223 is supported so as to be pivotable about the support shaft 226. A pair of front and rear stoppers 223c that abut against the attaching portion 225b are provided on a portion of the right portion of the storage section 223 between the pair of front and rear supporting portions 223b so as to prevent the lid member 225 from pivoting and opening further from the open position.

A groove portion 223d into which an outer circumferential portion of the lid member 225 at the closed position is fitted is formed along the entire length of an outer circumferential portion of the storage space S around an upper end of the storage section 223. A recessed portion 223e is formed in a portion of the storage section 223 corresponding to the handle portion 225c so as to prevent interference with the handle portion 225c. A locking hole 223f is formed in the recessed portion 223e.

The claw portion 225d is locked to the locking hole 223f, and thus the lid member 225 is fixed at the closed position. It is possible to lock the claw portion 225d to the locking hole 223f or remove the claw portion 225d from the locking hole 223f by pushing down or pulling up the handle portion 225c.

Summary of Third Embodiment

The above-described work vehicle includes:

a driver's seat 209 on which a driver can sit;

a storage section 223 that is located adjacent to the driver's seat 209 in a right-left direction of a vehicle body and includes a storage space S that is recessed downward; and a lid member 225 that can be switched to an open state in which the lid member 225 exposes the storage space S to the outside, and a closed state in which the lid member 225 covers the storage space S from above.

The lid member 225 is pivotable between an open position corresponding to the open state and a closed position corresponding to the closed state.

The lid member 225 is pivotable about a pivot axis Y1 that extends in a front-rear direction of the vehicle body, between the open position and the closed position, and the pivot axis Y1 is located on the driver's seat 209 side relative to the storage section 223.

A groove portion 223d into which an outer circumferential portion of the lid member 225 in the closed state is fitted is formed along an outer circumferential portion of the storage space S around an upper end of the storage section 223.

A direct current outlet 224 is provided in the storage space S.

The direct current outlet 224 is provided in the storage space S at a position that is on a front side.

A description label 227 for the direct current outlet 224 is attached to a portion of the lid member 225 on a side that faces the storage space S.

Other Embodiments Related to Third Embodiment

The following describes other embodiments. Two or more of the other embodiments below may be combined and applied to the embodiment above as long as there is no inconsistency. Note that the scope of the present invention is not limited to these embodiments.

(1) In the embodiment above, the storage section 223 is located on the left side of the driver's seat 209 so as to be adjacent thereto. Alternatively, or in conjunction with the configuration above, a storage section 223 may be located on the right side of the driver's seat 209 so as to be adjacent thereto.

(2) In the above-described embodiment, the lid member 225 is pivotable between the open position and the closed position. Alternatively, the lid member 225 may be slidable between the open position and the closed position in the front-rear direction of the vehicle body or the right-left direction of the vehicle body.

(3) In the above-described embodiment, the pivot axis Y1 is located on the driver's seat 209 side relative to the storage section 223. Alternatively, the pivot axis Y1 may be located on the side that is opposite the driver's seat 209 relative to the storage section 223.

(4) In the above-described embodiment, the direct current outlet 224 is provided in a front end of the storage space S. Alternatively, the direct current outlet 224 may be provided at a position on the front side in the storage space S other than a position in the front end. Alternatively, the direct current outlet 224 may be provided at a position on the rear side in the storage space S. Alternatively, the direct current outlet 224 may be provided at a position in a central portion of the storage space S in a front-rear direction. Alternatively, the direct current outlet 224 may be provided at a position outside the storage space S.

(5) In the above-described embodiment, the description label 227 is attached to a portion of the lid member 225 that faces the storage space S. Alternatively, the description label 227 may be attached to a portion of the lid member 225 that is on the side that is opposite the side that faces the storage space S. Alternatively, the description label 227 may be attached to a member other than the lid member 225.

(6) The configuration according to the third embodiment is also applicable to a combine and a rice transplanter, in addition to a tractor. This configuration is applicable to a construction work vehicle, in addition to a farm work vehicle.

What is claimed is:

1. A tractor comprising:
   a vehicle body frame;
   an engine that is mounted on a front portion of the vehicle body frame;
   a hood that houses the engine, the hood being configured to pivot up/down about a front pivot that is located on a front end of the vehicle body frame, between a closed position at which the hood covers the engine and an open position at which the hood exposes the engine;
   an anti-vibration member that is provided between the engine and the vehicle body frame and supports the engine in an anti-vibration manner; and
   a hood stay that supports the hood such that the hood is pivotable up/down about the front pivot, the hood stay including an abutting-target portion against which the engine is configured to abut from a rear side, to prevent the engine from swinging forward in a front-rear direction of the vehicle body,
   wherein
   the anti-vibration member includes: a first anti-vibration member that is attached by a first attaching member to a position that is forward and to the right of the engine; and a second anti-vibration member that is attached by a second attaching member to a position that is forward and to the left of the engine,
   the abutting-target portion includes: a first abutting-target portion that is located forward and to the right of the engine; and a second abutting-target portion that is located forward and to the left of the engine, and
   the first attaching member is configured to abut against the first abutting-target portion from the rear side, and the second attaching member is configured to abut against the second abutting-target portion from the rear side.

2. A tractor comprising:
   a vehicle body frame;
   an engine that is mounted on a front portion of the vehicle body frame;
   a hood that houses the engine, the hood being configured to pivot up/down about a front pivot that is located on a front end of the vehicle body frame, between a closed position at which the hood covers the engine and an open position at which the hood exposes the engine;
   an anti-vibration member that is provided between the engine and the vehicle body frame and supports the engine in an anti-vibration manner; and
   a hood stay that supports the hood such that the hood is pivotable up/down about the front pivot, the hood stay including an abutting-target portion against which the engine is configured to abut from a rear side, to prevent the engine from swinging forward in a front-rear direction of the vehicle body,
   wherein
   the vehicle body frame includes: a first main frame that is located on a right side of the engine and extends in the front-rear direction of the vehicle body; and a second main frame that is located on a left side of the engine and extends in the front-rear direction of the vehicle body,
   the hood stay includes: a first hood stay that is provided on a surface of the first main frame inside the vehicle body; and a second hood stay that is provided on a surface of the second main frame inside the vehicle body,
   the abutting-target portion includes: a first abutting-target portion that is located on a rear end of the first hood stay; and a second abutting-target portion that is located on a rear end of the second hood stay,
   a first engine supporting frame that supports a right portion of the engine extends in the front-rear direction of the vehicle body inside the first main frame relative to the vehicle body, and a second engine supporting frame that supports a left portion of the engine extends in the front-rear direction of the vehicle body inside the second main frame relative to the vehicle body,
   the anti-vibration member includes: a first anti-vibration member that is attached to a position between a front end of the first engine supporting frame and the first main frame by a first attaching member; and a second anti-vibration member that is attached to a position between a front end of the second engine supporting frame and the second main frame by a second attaching member, and
   the first attaching member is configured to abut against the first abutting-target portion from the rear side, and the second attaching member is configured to abut against the second abutting-target portion from the rear side.

3. A tractor comprising:
   a vehicle body frame;
   an engine that is mounted on a front portion of the vehicle body frame;
   a hood that houses the engine, the hood being configured to pivot up/down about a front pivot that is located on a front end of the vehicle body frame, between a closed position at which the hood covers the engine and an open position at which the hood exposes the engine;
   an anti-vibration member that is provided between the engine and the vehicle body frame and supports the engine in an anti-vibration manner; and
   a hood stay that supports the hood such that the hood is pivotable up/down about the front pivot, the hood stay including an abutting-target portion against which the engine is configured to abut from a rear side, to prevent the engine from swinging forward in a front-rear direction of the vehicle body,
   wherein
   the vehicle body frame includes: a first main frame that is located on a right side of the engine and extends in the front-rear direction of the vehicle body; and a second main frame that is located on a left side of the engine and extends in the front-rear direction of the vehicle body, a first engine supporting frame that supports a right portion of the engine extends in the front-rear direction of the vehicle body inside the first main frame relative to the vehicle body, and a second engine supporting frame that supports a left portion of the engine extends in the front-rear direction of the vehicle body inside the second main frame relative to the vehicle body, a first lateral-swing stopper member for the engine is provided on and protrudes from a surface of the first engine supporting frame on the first main frame side, with a first lateral gap between the first lateral-swing stopper member and the first main frame, and a second lateral-swing stopper member for the engine is provided on and protrudes from a surface of the second engine supporting frame on the second main frame side, with a second lateral gap between the second lateral-swing stopper member and the second main frame.

4. A tractor comprising:

a vehicle body frame;

an engine that is mounted on a front portion of the vehicle body frame;

a hood that houses the engine, the hood being configured to pivot up/down about a front pivot that is located on a front end of the vehicle body frame, between a closed position at which the hood covers the engine and an open position at which the hood exposes the engine;

an anti-vibration member that is provided between the engine and the vehicle body frame and supports the engine in an anti-vibration manner;

a hood stay that supports the hood such that the hood is pivotable up/down about the front pivot, the hood stay including an abutting-target portion against which the engine is configured to abut from a rear side, to prevent the engine from swinging forward in a front-rear direction of the vehicle body; and a flywheel that is attached to a front end of the engine, wherein the hood stay includes: a first hood stay that is located forward and to the right of the engine; and a second hood stay that is located forward and to the left of the engine, and a cover that covers the flywheel from a front side extends between the first hood stay and the second hood stay.

\* \* \* \* \*